United States Patent
Mishima et al.

(10) Patent No.: US 11,518,826 B2
(45) Date of Patent: Dec. 6, 2022

(54) METHOD FOR PRODUCING POLYTETRAFLUOROETHYLENE POWDER

(71) Applicant: DAIKIN INDUSTRIES, LTD., Osaka (JP)

(72) Inventors: Kazuhiro Mishima, Osaka (JP); Takahiro Taira, Osaka (JP); Chiaki Okui, Osaka (JP); Takayuki Tanaka, Osaka (JP); Masayoshi Miyamoto, Osaka (JP); Taku Yamanaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 120 days.

(21) Appl. No.: 16/957,288

(22) PCT Filed: Dec. 25, 2018

(86) PCT No.: PCT/JP2018/047574
§ 371 (c)(1),
(2) Date: Jun. 23, 2020

(87) PCT Pub. No.: WO2019/131633
PCT Pub. Date: Jul. 4, 2019

(65) Prior Publication Data
US 2021/0388126 A1 Dec. 16, 2021

(30) Foreign Application Priority Data
Dec. 25, 2017 (JP) .............................. JP2017-248551

(51) Int. Cl.
| C08F 2/46 | (2006.01) |
| C08F 2/50 | (2006.01) |
| C08G 61/04 | (2006.01) |
| C08F 14/26 | (2006.01) |
| C08J 3/16 | (2006.01) |
| C08J 3/28 | (2006.01) |

(52) U.S. Cl.
CPC ............... *C08F 14/26* (2013.01); *C08J 3/16* (2013.01); *C08J 3/28* (2013.01); *C08J 2327/18* (2013.01)

(58) Field of Classification Search
CPC ..... C08F 2/24; C08F 6/22; C08F 14/26; C08J 3/16; C08J 3/28; C08J 2327/18
USPC ................. 522/79, 74, 71, 1; 520/1
See application file for complete search history.

(56) References Cited

U.S. PATENT DOCUMENTS

| 3,250,808 | A | 5/1966 | Moore, Jr. et al. |
| 3,271,341 | A | 9/1966 | William, Jr. |
| 6,630,081 | B1 | 10/2003 | Furuya |
| 6,841,616 | B2 | 1/2005 | Wille et al. |
| 2003/0130393 | A1 | 7/2003 | Cavanaugh et al. |
| 2007/0015864 | A1 | 1/2007 | Hintzer et al. |
| 2007/0015865 | A1 | 1/2007 | Hintzer et al. |
| 2007/0015866 | A1 | 1/2007 | Hintzer et al. |
| 2007/0117914 | A1 | 5/2007 | Hintzer et al. |
| 2007/0135558 | A1 | 6/2007 | Tsuda et al. |
| 2007/0142541 | A1 | 6/2007 | Hintzer et al. |
| 2007/0276103 | A1 | 11/2007 | Guerra et al. |
| 2008/0006910 | A1 | 1/2008 | Miyata et al. |
| 2008/0015319 | A1 | 1/2008 | Hintzer et al. |
| 2008/0020159 | A1 | 1/2008 | Taira et al. |
| 2008/0200571 | A1 | 8/2008 | Higuchi et al. |
| 2008/0200627 | A1 | 8/2008 | Funaki et al. |
| 2008/0214714 | A1 | 9/2008 | Hoshikawa et al. |
| 2009/0239994 | A1 | 9/2009 | Tsuda et al. |
| 2009/0269044 | A1 | 10/2009 | Yamakawa |
| 2010/0187659 | A1 | 7/2010 | Miyata et al. |
| 2012/0116003 | A1 | 5/2012 | Brothers et al. |
| 2012/0116015 | A1 | 5/2012 | Brothers et al. |
| 2012/0116017 | A1 | 5/2012 | Brothers et al. |
| 2013/0122302 | A1 | 5/2013 | Miyamoto et al. |
| 2014/0018499 | A1 | 1/2014 | Brothers et al. |
| 2014/0077373 | A1 | 3/2014 | Miyata et al. |
| 2014/0291845 | A1 | 10/2014 | Miyata et al. |
| 2015/0091169 | A1 | 4/2015 | Miyata et al. |
| 2015/0141581 | A1 | 5/2015 | Brothers et al. |
| 2015/0311165 | A1 | 10/2015 | Miyata et al. |
| 2016/0122509 | A1* | 5/2016 | Brothers ................. C08F 14/26 524/745 |
| 2016/0181210 | A1 | 6/2016 | Miyata et al. |
| 2016/0237189 | A1 | 8/2016 | Taira et al. |
| 2017/0073435 | A1 | 3/2017 | Brothers et al. |
| 2017/0162463 | A1 | 6/2017 | Miyata et al. |

FOREIGN PATENT DOCUMENTS

| JP | 10-147617 A | | 6/1998 |
| JP | 10147617 | * | 6/1998 |
| JP | 2001-11677 A | | 1/2001 |
| JP | 2003-119204 A | | 4/2003 |
| JP | 2005-527652 A | | 9/2005 |

(Continued)

OTHER PUBLICATIONS

Sollner et al, The mechanism of coagulation by ultrasonic waves, 1936 (Year: 1936).*
Hosokawa et al, JP 10147617 Machine Translation, Jun. 2, 1998 (Year: 1998).*
Nanba et al, JP 2011-016956 Machine Translation, Jan. 27, 2011 (Year: 2011).*
Kato et al, WO 2018181898 Machine Translation, Oct. 4, 2018 (Year: 2018).*
International Preliminary Report on Patentability dated Jun. 30, 2020 and Written Opinion from the International Bureau in International Application No. PCT/JP2018/047574.

(Continued)

*Primary Examiner* — Jessica Whiteley
(74) *Attorney, Agent, or Firm* — Sughrue Mion, PLLC

(57) ABSTRACT

A method for producing a polytetrafluoroethylene powder, which includes applying an ultrasonic wave to a polytetrafluoroethylene aqueous dispersion containing polytetrafluoroethylene particles to coagulate the polytetrafluoroethylene particles.

2 Claims, No Drawings

(56) References Cited

FOREIGN PATENT DOCUMENTS

| | | | |
|---|---|---|---|
| JP | 2011-016956 | * | 1/2011 |
| JP | 2011-16956 A | | 1/2011 |
| JP | 2013-528663 A | | 7/2013 |
| JP | 2013-542308 A | | 11/2013 |
| JP | 2013-542309 A | | 11/2013 |
| JP | 2013-542310 A | | 11/2013 |
| JP | 2015-516029 A | | 6/2015 |
| WO | 97/22452 A1 | | 6/1997 |
| WO | 2005/042593 A1 | | 5/2005 |
| WO | 2006/054612 A1 | | 5/2006 |
| WO | 2007/046345 A1 | | 4/2007 |
| WO | 2007/046377 A1 | | 4/2007 |
| WO | 2007/046482 A1 | | 4/2007 |
| WO | 2007/119526 A1 | | 10/2007 |
| WO | 2008060461 A1 | | 5/2008 |
| WO | WO-2018181898 A1 * | 10/2018 | .............. C08F 14/18 |

OTHER PUBLICATIONS

International Search Report dated Apr. 9, 2019, issued by the International Searching Authority in application No. PCT/JP2018/047574.

* cited by examiner

METHOD FOR PRODUCING POLYTETRAFLUOROETHYLENE POWDER

CROSS-REFERENCE TO RELATED APPLICATIONS

This application is a National Stage of International Application No. PCT/JP2018/047574 filed on Dec. 25, 2018, which claims priority under U.S.C. § 119(a) to Japanese Patent Application No. 2017-248551 filed on Dec. 25, 2017.

TECHNICAL FIELD

The present invention relates to a method for producing a polytetrafluoroethylene powder.

BACKGROUND ART

Polytetrafluoroethylene [PTFE] has been used in various applications because of its excellent properties. For example, when molding PTFE into an electric wire, a cable, a tube, a filter, or the like, the PTFE is molded after being formed into a PTFE powder.

Conventionally, when a polytetrafluoroethylene (PTFE) powder is obtained from a PTFE aqueous dispersion, a coagulation method in which a coagulant such as nitric acid or ammonium carbonate is added to the dispersion has been used (for example, see Patent Document 1).

Meanwhile, Patent Document 2 discloses a method for producing a reaction layer raw material or a gas supply layer raw material for a gas diffusion electrode, comprising dispersing a gas diffusion electrode material other than PTFE in an organic solvent that does not mix with water, adding a PTFE dispersion to the dispersion liquid, and mixing and dispersing PTFE fine particles with the gas diffusion electrode material in the organic solvent by ultrasonic application or vigorous stirring and shaking.

RELATED ART

Patent Documents

Patent Document 1: National Publication of International Patent Application No. 2013-528663
Patent Document 2: Japanese Patent Laid-Open No. 2001-11677

SUMMARY OF THE INVENTION

Problem to be Solved by the Invention

An object of the present invention is to provide a novel method for producing a polytetrafluoroethylene powder.

Means for Solving the Problem

The present invention provides a method for producing a polytetrafluoroethylene powder, comprising applying an ultrasonic wave to a polytetrafluoroethylene aqueous dispersion containing a polytetrafluoroethylene particle to coagulate the polytetrafluoroethylene particle.

The polytetrafluoroethylene aqueous dispersion is preferably obtained by polymerizing tetrafluoroethylene in an aqueous medium in the presence of a hydrocarbon surfactant.

Effects of Invention

The production method of the present invention is a novel method for producing a fluoropolymer powder.

DESCRIPTION OF EMBODIMENTS

Before specifically describing the present invention, the "organic group" as used herein will be described.

As used herein, the team "organic group" means a group containing 1 or more carbon atoms or a group foamed by removing one hydrogen atom from an organic compound.

Examples of the "organic group" include:
an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents,
a non-aromatic heterocyclic group optionally having one or more substituents,
a heteroaryl group optionally having one or more substituents, cyano group,
formyl group,
$RaO-$,
$RaCCH$,
$RaSO_2-$,
$RaCOO-$,
$RaNRaCO-$,
$RaCONRa-$,
$RaOCO-$,
$RaOSO_2-$, and
$RaNRbSO_2-$,
wherein each Ra is independently:
an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents,
a non-aromatic heterocyclic group optionally having one or more substituents, or
a heteroaryl group optionally having one or more substituents, and
each Rb is independently H or an alkyl group optionally having one or more substituents.

The organic group is preferably an alkyl group optionally having one or more substituents.

Hereinafter, the present invention will be described specifically.

A method for producing a polytetrafluoroethylene powder of the present invention includes applying an ultrasonic wave to a PTFE aqueous dispersion containing polytetrafluoroethylene (PTFE) particles to coagulate the PTFE particles (hereinafter also referred to as a "coagulation step").

The PTFE particles comprise PTFE.

The PTFE may be a TFE homopolymer or a modified PTFE, for example. The modified PTFE contains a TFE unit and a modifying monomer unit based on a modifying monomer copolymerizable with TFE.

The modifying monomer is not limited as long as the modifying monomer is copolymerizable with TFE, and examples thereof include perfluoroolefins such as hexafluoropropylene [HFP]; chlorofluoroolefins such as chlorotrifluoroethylene [CTFE]; hydrogen-containing fluoroolefins such as trifluoroethylene and vinylidene fluoride [VDF]; perfluorovinyl ethers; perfluoroalkylethylene; ethylene; and fluorine-containing vinyl ethers having a nitrile group. One modifying monomer may be used or multiple modifying monomers may be used.

The perfluorovinyl ether is not limited, and may be, for example, an unsaturated perfluoro compound represented by the following general formula (X):

$$CF_2=CF-ORf \quad (X)$$

wherein Rf represents a perfluoro organic group. As used herein, the team "perfluoro organic group" means an organic group in which all hydrogen atoms bonded to carbon atoms are replaced with fluorine atoms. The perfluoro organic group optionally contains ether oxygen.

Examples of the perfluorovinyl ether include perfluoro (alkyl vinyl ether) [PAVE]represented by the general formula (A) wherein Rf is a perfluoroalkyl group having 1 to 10 carbon atoms. The perfluoroalkyl group preferably has 1 to 5 carbon atoms.

Examples of the perfluoroalkyl group in the PAVE include a perfluoromethyl group, a perfluoroethyl group, a perfluoropropyl group, a perfluorobutyl group, a perfluoropentyl group, and a perfluorohexyl group, and perfluoromethyl vinyl ether [PMVE] in which the perfluoroalkyl group is a perfluoromethyl group and perfluoropropyl vinyl ether [PPVE] in which the perfluoroalkyl group is a perfluoropropyl group are preferred.

The perfluoroalkylethylene is not limited, and examples thereof include perfluorobutylethylene (PFBE), perfluorohexylethylene (PFHE), and perfluorooctylethylene (PFOE).

The modifying monomer in the modified PTFE is preferably at least one selected from the group consisting of HFP, CTFE, VDF, PMVE, PPVE, PFBE, PFHE and ethylene.

The modified PTFE preferably has a modifying monomer unit in the range of 0.0001 to 1 mass %. The lower limit of the content of the modifying monomer unit is more preferably 0.001 mass %, and still more preferably 0.01 mass %. The upper limit of the content of the modifying monomer unit is more preferably 0.5 mass %, and still more preferably 0.3 mass %. As used herein, the team "modifying monomer unit" means a moiety that is part of the molecular structure of the modified PTFE and is derived from a modifying monomer, and the team "all the monomer units" means a moiety derived from all of the monomers in the molecular structure of the modified PTFE.

The standard specific gravity (SSG) and the melt viscosity (MV) of the PTFE, used as an index of the molecular weight, are not limited.

For example, the PTFE may be a high molecular weight PTFE that is non melt-fabricable and fibrillatable, or a low molecular weight PTFE that is melt-fabricable and non-fibrillatable.

The team "non melt-fabricable" means a feature of a polymer that the melt flow rate thereof cannot be measured at a temperature higher than the crystalline melting point in conformity with ASTM D1238, and the team "melt-fabricable" means a feature of a polymer that the melt flow rate thereof can be measured at a temperature higher than the crystalline melting point in conformity with ASTM D1238.

Whether the PTFE is fibrillatable or not can be determined by "paste extrusion", which is a representative method of molding a high molecular weight PTFE powder. The high molecular weight PTFE powder is allowed to be paste-extruded because it is fibrillatable. If a continuous extrudate (extruded strand) cannot be obtained by paste extrusion, or a non-sintered molded article obtained by paste extrusion shows substantially no strength or elongation (for example, if it shows an elongation of 0% and is broken when stretched), it can be considered as non-fibrillatable.

The high molecular weight PTFE preferably has a standard specific gravity (SSG) of 2.130 to 2.280. The standard specific gravity is determined by a water replacement method in conformity with ASTM D-792 using a sample molded in conformity with ASTM D4895-89. The team "high molecular weight" as used herein means that the standard specific gravity is within the above range.

The low molecular weight PTFE has a melt viscosity at 380° C. of $1 \times 10^2$ to $7 \times 10^3$ Pas. The team "low molecular weight" as used herein means that the melt viscosity is within the above range.

The high molecular weight PTFE has a remarkably higher melt viscosity than that of the low molecular weight PTFE, and the melt viscosity thereof is difficult to measure accurately. On the other hand, the melt viscosity of the low-molecular-weight PTFE is measurable, but the low molecular weight PTFE has difficulty in providing a molded product to be used in the measurement of the standard specific gravity, and thus, the standard specific gravity thereof is difficult to measure accurately. Accordingly, in the present invention, the standard specific gravity is used as an index of the molecular weight of the high molecular weight PTFE, while the melt viscosity is used as an index of the molecular weight of the low molecular weight PTFE. It should be noted that for both the high molecular weight PTFE and the low molecular weight PTFE, no measurement methods for directly specifying the molecular weight have been known so far.

The high molecular weight PTFE preferably has a peak temperature of 333 to 347° C., and more preferably 335 to 345° C. The low molecular weight PTFE preferably has a peak temperature of 322 to 333° C., and more preferably 324 to 332° C. The peak temperature is the temperature corresponding to the maximum value on a heat-of-fusion curve with a heating rate of 10° C./min using a differential scanning calorimeter (DSC) for a PTFE which has never been heated up to 300° C. or higher.

Preferably, the high molecular weight PTFE has at least one endothermic peak in the temperature range of 333 to 347° C. on a heat-of-fusion curve with a heating rate of 10° C./min using a differential scanning calorimeter (DSC) for a PTFE which has never been heated up to 300° C. or higher, and has an enthalpy of fusion of 62 mJ/mg or higher at 290 to 350° C. calculated from the heat-of-fusion curve.

The PTFE particles may have a core-shell structure. An example of the PTFE having a core-shell structure is a modified PTFE including a core of high molecular weight PTFE and a lower molecular weight PTFE or modified PTFE shell in the particles. An example of such a modified PTFE is a PTFE disclosed in National Publication of International Patent Application No. 2005-527652.

The following structure can be taken as the core-shell structure.

| | |
|---|---|
| Core: TFE homopolymer | Shell: TFE homopolymer |
| Core: modified PTFE | Shell: TFE homopolymer |
| Core: modified PTFE | Shell: modified PTFE |
| Core: TFE homopolymer | Shell: modified PTFE |
| Core: Low molecular weight PTFE | Shell: high molecular weight PTFE |
| Core: High molecular weight PTFE | Shell: low molecular weight PTFE |

In the PTFE particles having a core-shell structure, the lower limit of the ratio of the core is preferably 0.5 mass %, more preferably 1.0 mass %, still more preferably 3.0 mass %, particularly preferably 5.0 mass %, and most preferably 10.0 mass %. The upper limit of the ratio of the core is preferably 99.5 mass %, more preferably 99.0 mass %, still more preferably 97.0 mass %, particularly preferably 95.0 mass %, and most preferably 90.0 mass %.

In the PTFE particles having a core-shell structure, the lower limit of the shell ratio is preferably 0.5 mass %, more preferably 1.0 mass %, still more preferably 3.0 mass %, particularly preferably 5.0 mass %, and most preferably 10.0 mass %. The upper limit of the shell ratio is preferably 99.5 mass %, more preferably 99.0 mass %, still more preferably 97.0 mass %, particularly preferably 95.0 mass %, and most preferably 90.0 mass %.

In the PTFE particles having a core-shell structure, the core or the shell may have a structure of two or more layers. For example, the PTFE particles may have a trilayer structure including a core center portion of a modified PTFE, a core outer layer portion of a TFE homopolymer, and a shell of a modified PTFE. An example of PTFE particles having such a trilayer structure is a PTFE disclosed in International Publication No. WO2006/054612.

The amounts of the respective monomers constituting the PTFE can be calculated by any appropriate combination of NMR, FT-IR, elemental analysis, and X-ray fluorescence analysis in accordance with the types of the monomers.

The PTFE aqueous dispersion contains PTFE particles. The concentration of the PTFE particles is usually 1 to 70 mass % of the PTFE aqueous dispersion. The concentration of the PTFE particles is preferably from 8 to 60 mass %, and more preferably from 8 to 50 mass %. The lower limit of the concentration of the PTFE particles is still more preferably 10 mass % of the PTFE aqueous dispersion, and particularly preferably 15 mass %, and the upper limit thereof is still more preferably 40 mass %, and particularly preferably is 35 mass %.

The average primary particle size of the PTFE particles is, for example, 50 to 500 nm. The lower limit of the average primary particle size is preferably 100 nm, and more preferably 150 nm. The upper limit of the average primary particle size is preferably 400 nm, more preferably 350 nm, and still more preferably 300 nm.

The average primary particle size can be determined as follows. A calibration curve is drawn between the transmittance of incident light at 550 nm with respect to the unit length of the aqueous dispersion with a PTFE particle with an adjusted concentration of 0.15 mass % and the average primary particle size determined by measuring the Feret diameters in a transmission electron microscopic image; the transmittance of the target aqueous dispersion is measured; and then the average primary particle size is determined on the basis of the calibration curve.

The PTFE aqueous dispersion usually contains an aqueous medium. The aqueous medium is not limited as long as the aqueous medium is a liquid containing water, and may contain, in addition to water, an organic solvent such as an alcohol, an ether, a ketone, or paraffin wax, for example.

The aqueous medium preferably contains 50 mass % or more of water, more preferably 80 mass % or more, and most preferably 100 mass %.

The PTFE aqueous dispersion usually contains a surfactant. For example, the surfactant may be a fluorine-containing surfactant or a hydrocarbon surfactant. The hydrocarbon surfactant is a surfactant free of fluorine atoms.

The fluorine-containing surfactant and the hydrocarbon surfactant are not limited, and may be a conventionally known surfactant, and examples thereof include fluorine-containing surfactants and hydrocarbon surfactants described below.

The content of the surfactant in the PTFE aqueous dispersion is not limited, but is preferably 0.0001 to 10.0 mass % with respect to 100 mass % of the PTFE aqueous dispersion. Less than 0.0001 mass % of the surfactant may cause poor dispersion stability. More than 10.0 mass % thereof may fail to give a dispersing effect corresponding to the amount thereof, and thus is impractical. The lower limit of the content of the surfactant is more preferably 0.001 mass %, still more preferably 0.01 mass %, and particularly preferably 0.07 mass %. The upper limit thereof is more preferably 8.5 mass %, still more preferably 1.0 mass %, still further preferably 0.90 mass %, still more preferably 0.46 mass %, and particularly preferably 0.32 mass %.

The PTFE aqueous dispersion may be obtained by a conventionally known method.

The PTFE aqueous dispersion to be used may contain a melt-fabricable fluororesin in addition to PTFE particles, and for example, may be a mixture of an aqueous dispersion containing PTFE particles and an aqueous dispersion of melt-fabricable fluororesin.

Examples of the melt-fabricable fluororesin include TFE/HFP copolymer [FEP], TEE/PAVE copolymer [PFA], ethylene/TFE copolymer [ETFE], and ethylene/TFE/HFP copolymer. Among them, FEP is preferred.

The application of ultrasonic wave in the coagulation step is preferably performed with an output of 20 W or more from the viewpoint of coagulating the PTFE particles. Low application output may prolong the coagulation time and may decrease productivity. In addition, there is a possibility that the intended PTFE powder cannot be obtained because the powder cannot be coagulated.

The application output is more preferably performed at an output of 100 W or more, and still more preferably 200 W or more. The upper limit of the output is not limited, but may be, for example, 3000 W or less, and is preferably 1000 W or less, and more preferably 800 W or less.

It is preferable that the application of ultrasonic wave be performed at a frequency of 15 kHz or more from the viewpoint of coagulating the PTFE particles. The frequency is more preferably 18 kHz or more. The upper limit of the frequency is not limited, but is, for example, preferably 100 kHz or less, more preferably 50 kHz or less, and still more preferably 40 kHz or less.

The application time of the ultrasonic wave is not limited, but is preferably, for example, 60 seconds or more, and more preferably 300 seconds or more.

The application time of the ultrasonic wave may be any time sufficient for coagulating the PTFE particles, and is preferably 20 minutes or less from the viewpoint of productivity.

The ultrasonic application may be performed using a commercially available ultrasonic generator.

Examples of the ultrasonic application device include a commercially available ultrasonic transmission device (for example, an ultrasonic homogenizer), an ultrasonic transmitter, a circulating ultrasonic application device, an ultrasonic vibrator, and an ultrasonic cleaner, and these may be appropriately selected and used. A method for applying an ultrasonic wave to the aqueous dispersion may be any method capable of causing aggregation of the PTFE aqueous dispersion, and may be performed by a conventionally known method.

Examples of the specific method for applying an ultrasonic wave include a method of immersing a nozzle portion of an ultrasonic homogenizer in a PTFE aqueous dispersion and then performing ultrasonic application, a method of immersing a throw-in ultrasonic vibrator in a container into which a PTFE aqueous dispersion has been introduced and then applying an ultrasonic wave, a method of introducing a container containing a PTFE aqueous dispersion into an ultrasonic cleaner charged in advance with an aqueous medium and applying an ultrasonic wave, and a method of introducing a PTFE dispersion into an ultrasonic cleaner or an ultrasonic transmitter manufactured in a tank type and applying an ultrasonic wave.

In the coagulation step, it is preferable to adjust the temperature of the aqueous dispersion to 0 to 80° C. and then apply ultrasonic waves. The lower limit of the temperature of the aqueous dispersion is more preferably 10° C., and still more preferably 20° C. The upper limit of the temperature of the aqueous dispersion is more preferably 50° C., and still more preferably 40° C.

The pH may be adjusted as needed. For example, there is a method in which ammonium carbonate, nitric acid, or the like is appropriately added before applying ultrasonic waves.

It is preferable to adjust the specific gravity of the aqueous dispersion to 1.03 to 1.20. The upper limit of the specific gravity of the aqueous dispersion is more preferably 1.10, and still more preferably 1.08.

The concentration of the unaggregated TFE polymer in the discharge water generated by the coagulation step is preferably low, more preferably less than 0.4 mass %, and still more preferably less than 0.3 mass %, from the viewpoint of productivity.

By the coagulation step, the PTFE particles in the PTFE aqueous dispersion coagulate to form a wet PTFE powder.

The production method of the present invention may further include isolating the wet PTFE powder from the post-coagulation dispersion containing the wet PTFE powder obtained in the coagulation step.

Further, the method may include drying the isolated wet PTFE powder.

Drying is preferably pertained using heating means such as hot air while the wet PTFE powder is less fluidized. The drying temperature may be any temperature lower than the melting point of the polymer, but is usually suitably in the range of 100 to 300° C. The drying may be performed at a drying temperature of 120 to 250° C., and preferably 140 to 230° C. The drying may be performed in combination with reduced pressure, vacuum, or high frequency.

The drying time is not limited, and the drying is preferably performed until the PTFE powder being dried does not contain moisture anymore.

The PTFE obtained by the production method of the present invention preferably has a color tone $L^*$ of 88 or more, and more preferably 90 or more.

The PTFE obtained by the production method of the present invention preferably has a color tone Z of 80 or more, more preferably 85 or more, and still more preferably 90 or more.

The color tone $L^*$ of the PTFE obtained by the production method of the present invention after sintering at 385° C. for 10 minutes is preferably 40 or more, and more preferably 45 or more.

The color tone Z of the PTFE obtained by the production method of the present invention after sintering at 385° C. for 10 minutes is preferably 10 or more, and more preferably 15 or more.

A sample for measurement of the color tone $L^*$ and Z is obtained by molding 4.0 g of PTFE powder into a disk-shaped PTFE molded body having an inner diameter of 28.6 mm and a thickness of about 4 mm.

The color tone $L^*$ and Z of the PTFE are determined using a colorimeter (CIELAB color scale) in conformity with JIS Z8781-4.

The sintering is performed by performing a heat treatment in an electric furnace heated to 385° C. for 10 minutes.

The PTFE powder obtained by the production method of the present invention preferably has an apparent density of 0.60 g/ml or less, more preferably 0.55 g/ml or less, and still more preferably 0.52 g/ml or less, and is preferably 0.40 g/ml or more, more preferably 0.45 g/ml or more, and still more preferably 0.47 g/ml or more.

The apparent density is a value determined in conformity with JIS K6892.

The PTFE powder obtained by the production method of the present invention preferably has an average particle size of 1000 μm or less, more preferably 800 μm or less, and still more preferably 700 μm or less, and preferably 300 μm or more, more preferably 400 μm or more, and still more preferably 500 μm or more.

The average particle size is a value determined in conformity with JIS K6891.

The production method of the present invention is simple because coagulation can be caused by applying ultrasonic waves and is advantageous in terms of unnecessity of a step of removing the coagulant or the like, because a large amount of a coagulant or the like is not necessarily needed.

Furthermore, since the PTFE aqueous dispersion usually contains a surfactant, the surfactant remains in the resulting PTFE powder. The production method of the present invention provides a PTFE powder having a small amount of a remaining surfactant.

The production method of the present invention is particularly useful when obtaining a PTFE powder from a PTFE aqueous dispersion produced using a hydrocarbon surfactant.

Conventionally, when PTFE is produced by emulsion polymerization, a fluorine-containing anionic surfactant has been used, but recently, the use of a hydrocarbon surfactant has been proposed in place of the fluorine-containing anionic surfactant.

However, when TFE is polymerized in the presence of a hydrocarbon surfactant, the resulting polytetrafluoroethylene powder tends to be colored, leaving room for improvement.

For example, National Publication of International Patent Application No. 2015-516029 discloses a process for reducing thermally induced discoloration of fluoropolymer resin, which comprises exposing the fluoropolymer resin in wet or dry foam to oxidizing agent.

The present inventors have conducted intensive studies and found that when coagulating a PTFE aqueous dispersion by applying an ultrasonic wave reduces the coloring of a PTFE powder obtained from the PTFE aqueous dispersion obtained using a hydrocarbon surfactant.

That is, the production method of the present invention includes applying an ultrasonic wave to a PTFE aqueous dispersion containing PTFE particles to coagulate the PTFE particles, and the polytetrafluoroethylene aqueous dispersion is preferably obtained by polymerizing tetrafluoroethylene in an aqueous medium in the presence of a hydrocarbon surfactant.

The method for producing PTFE powder of the present invention can reduce coloring of the resulting PTFE powder even if the PTFE aqueous dispersion is obtained using a hydrocarbon surfactant.

The PTFE aqueous dispersion may be obtained by a method including polymerizing tetrafluoroethylene in an aqueous medium in the presence of a hydrocarbon surfactant.

That is, one aspect of the present invention provides a method for producing a PTFE powder, comprising polymerizing tetrafluoroethylene in an aqueous medium in the presence of a hydrocarbon surfactant (hereinafter, also referred to as a "polymerization step"), and applying an ultrasonic wave to a PTFE aqueous dispersion containing PTFE particles to coagulate the PTFE particles.

For example, the polymerization may be an emulsion polymerization. In the above steps, the PTFE aqueous dispersion containing particles foamed of polytetrafluoroethylene may be obtained by polymerizing the TFE and optionally the above-mentioned modifying monomer copolymerizable with TFE.

The polymerization step is performed in the presence of a hydrocarbon surfactant. In the present invention, the hydrocarbon surfactant may be a generally known hydrocarbon surfactant, for example. For example, the hydrocarbon surfactant may be any of those described in National Publication of International Patent Application No. 2013-542308, National Publication of International Patent Application No. 2013-542309, and National Publication of International Patent Application No. 2013-542310. Details of the hydrocarbon surfactant will be described later.

In the polymerization step, an aqueous medium, the surfactant, TFE and optionally a modifying monomer copolymerizable with TFE and optionally another additive are charged into a polymerization reactor, and the mixture is stirred in the reactor while maintaining the reactor at a predetermined polymerization temperature, and then a predetermined amount of a polymerization initiator is added to the reactor to initiate the polymerization reaction. After the initiation of the polymerization reaction, a monomer such as TFE, a polymerization initiator, a chain transfer agent, the surfactant, and the like may be additionally added according to the purpose.

In the polymerization, the polymerization temperature is usually 5 to 120° C., and the polymerization pressure is 0.05 to 10 MPaG. The polymerization temperature and polymerization pressure are appropriately determined depending on the type of the monomer to be used, the target molecular weight of PTFE, and the reaction rate.

It is preferable that the hydrocarbon surfactant be added in a total amount of 0.0001 to 10 mass % with respect to 100 mass % of the aqueous medium. The lower limit thereof is more preferably 0.001 mass %, still more preferably 0.01 mass %, and particularly preferably 0.1 mass %. The upper limit thereof is more preferably 1.0 mass %, still more preferably 0.50 mass %, and particularly preferably 0.35 mass %. Less than 0.0001 mass % of the surfactant may cause insufficient dispersing force. More than 10 mass % thereof may fail to give effects corresponding to the amount thereof, and may decrease polymerization rate or stop the reaction. The amount of the hydrocarbon surfactant to be added is appropriately determined depending on the type of the monomer to be used, the target molecular weight of PTFE, and the like.

In the polymerization step, at least one hydrocarbon surfactant may be used. For example, two or more hydrocarbon surfactants described below may be used at the same time, and optional compounds having a surfactant function other than the hydrocarbon surfactant may also be used at the same time. A hydrocarbon surfactant and a fluorine-containing surfactant may also be used in combination.

In the production method of the present invention, a modifying monomer having a functional group capable of reacting by radical polymerization and a hydrophilic group (hereinafter referred to as "modifying monomer UQ") may be used together with the hydrocarbon surfactant. The modifying monomer (A) may be any compound having at least one vinyl group and having a surfactant function.

Examples of the hydrophilic group in the modifying monomer (A) include —NH$_2$, —PO$_3$M, —OPO$_3$M, —SO$_3$M, —OSO$_3$M, and —COOM, where M is H, a metal atom, NR$^7{}_4$, imidazolium optionally having a substituent, pyridinium optionally having a substituent, or phosphonium optionally having a substituent, P7s are each H or an organic group, and may be the same as or different from each other, and any two thereof are optionally bonded to each other to fauna ring. Among them, the hydrophilic group is preferably —SO$_3$M or —COOM. R$^7$ is preferably H or a C$_{1-10}$ organic group, more preferably H or a C$_{1-4}$ organic group, and still more preferably H or a C$_{1-4}$ alkyl group.

Examples of the metal atom include monovalent and divalent metal atoms, such as alkali metals (Group 1) and alkaline earth metals (Group 2), and preferred is Na, K, or Li.

Examples of the "functional group capable of reacting by radical polymerization" in the modifying monomer (A) include a group having an ethylenically unsaturated bond. The group having an ethylenically unsaturated bond may be represented by the following formula:

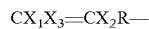

wherein X$_1$, X$_2$, and X$_3$ are each independently F, Cl, H, CF$_3$, CF$_2$H, CFH$_2$, or CH$_3$, and R is a linking group. Preferred examples thereof include groups including an unsaturated bond, such as —CH=CH$_2$, —CF=CH$_2$, —CH=CF$_2$, —CF=CF$_2$, —CH$_2$—CH=CH$_2$, —CF$_2$—CF=CH$_2$, —CF$_2$—CF=CF$_2$, —(C=O)—CH=CH$_2$, —(C=O)—CF=CH$_2$, —(C=O)—CH=CF$_2$, —(C=O)—CF=CF$_2$, —(C=O)—C(CH$_3$)=CH$_2$, —(C=O)—C(CF$_3$)=CH$_2$, —(C=O)—C(CH$_3$)=CF$_2$, —(C=O)—C(CF$_3$)=CF$_2$, —O—CH$_2$—CH=CH$_2$, —O—CF$_2$—CF=CH$_2$, —O—CH$_2$—CH=CF$_2$, and —O—CF$_2$—CF=CF$_2$.

Examples of the modifying monomer (A) include:

a surfactant represented by the general formula (270a):

$$CF_2=CF-(CF_2)_{n271a}-Y^{271}$$

wherein n271a represents an integer of 1 to 10, $Y^{271}$ represents $-SO_3M^{271}$ or $-COOM^{271}$, and $M^{271}$ is H, $NH_4$, or an alkali metal;

a surfactant represented by the general formula (270b):

$$CF_2=CF-(CF_2C(CF_3)F)_{n271b}-Y^{271}$$

wherein n271b represents an integer of 1 to 5, and $Y^{271}$ is defined as described above;

a surfactant represented by the general formula (270c):

$$CF_2=CF-O-(CFX^{271})_{n271c}-Y^{271}$$

wherein $X^{271}$ represents F or $CF_3$, n271c represents an integer of 1 to 10, and $Y^{271}$ is defined as described above;

a surfactant represented by the general formula (270d):

$$CF_2=CF-O-(CF_2CFX^{271}O)_{n271d}-CF_2CF_2-Y^{271}$$

wherein n271d represents an integer of 1 to 10, and $Y^{271}$ and $X^{271}$ are defined as described above; and a monomer represented by the general formula (270e):

$$CX^{272}{}_2=CFCF_2-O-(CF(CF_3)CF_2O)_{n271e}-CF(CF_3)-Y^{271}$$

wherein each $X^{272}$ is the same and represents F or H, n271e represents 0 or an integer of 1 to 10, and $Y^{271}$ is defined as described above.

The polymerization initiator to be used is not limited as long as the polymerization initiator is capable of generating a radical in the polymerization temperature range, and a known oil-soluble and/or water-soluble polymerization initiator may be used. Further, the polymerization initiator may be used in combination with a reducing agent or the like to fault a redox agent for initiating the polymerization. The concentration of the polymerization initiator is appropriately determined depending on the type of the modifying monomer copolymerizable with TFE, the target molecular weight of PTFE, and the reaction rate.

The polymerization initiator to be used may be a water-soluble radical polymerization initiator, for example.

The water-soluble radical polymerization initiator may be a known water-soluble peroxide, and examples of the water-soluble inorganic peroxide include ammonium salts, potassium salts, and sodium salts of persulfuric acid, perboric acid, perchloric acid, perphosphoric acid, and percarbonate. Examples of the water-soluble organic peroxide include disuccinic acid peroxide, diglutaric acid peroxide, t-butyl permaleate, and t-butyl hydroperoxide. Any reducing agent such as sulfites and sulfites may be used in combination with a peroxide, and the amount thereof used may be 0.1 to 20 times the amount of peroxide to be used.

The polymerization initiator is preferably a redox initiator obtained by combining an oxidizing agent and a reducing agent. Examples of the oxidizing agent include persulfates, organic peroxides, potassium permanganate, manganese triacetate, and cerium ammonium nitrate. Examples of the reducing agent include sulfites, bisulfites, bromates, diimines, and oxalic acid. Examples of the persulfates include ammonium persulfate and potassium persulfate. Examples of the sulfites include sodium sulfite and ammonium sulfite. In order to increase the decomposition rate of the initiator, the combination of a redox initiator preferably contains a copper salt or an iron salt. An example of the copper salt is copper(II) sulfate and an example of the iron salt is iron(II) sulfate.

Examples of the redox initiator include potassium permanganate/oxalic acid, ammonium persulfate/bisulfite/iron sulfate, ammonium persulfate/sulfite/iron sulfate, manganese triacetate/oxalic acid, cerium ammonium nitrate/oxalic acid, bromate/sulfite, and bromate/bisulfite, and preferred is potassium permanganate/oxalic acid. In the case of using a redox initiator, either an oxidizing agent or a reducing agent is charged into a polymerization tank in advance and the other is continually or intermittently added thereto to initiate the polymerization. For example, in the case of potassium permanganate/oxalic acid, preferably, oxalic acid is charged into a polymerization tank and potassium permanganate is continually added thereto.

The amount of the polymerization initiator to be added is not limited, but an amount (for example, several ppm to water concentration) not remarkably decreasing the polymerization rate at the beginning of polymerization or more may be added all at once, or may be added sequentially or continuously. The upper limit thereof is a range in which the reaction temperature is allowed to increase while the polymerization reaction heat is removed from the apparatus surface, and the upper limit thereof is preferably within a range in which the polymerization reaction heat can be removed through the apparatus surface.

The aqueous medium is a reaction medium for performing polymerization, and may be an aqueous medium that may be contained in the above-mentioned PTFE aqueous dispersion.

In the above polymerization, a known chain transfer agent, radical scavenger, and decomposing agent may be further added to control the polymerization rate and the molecular weight according to the purpose.

Examples of the chain transfer agent include esters such as dimethyl malonate, diethyl malonate, methyl acetate, ethyl acetate, butyl acetate, and dimethyl succinate, hydrogen, isopentane, methane, ethane, propane, methanol, isobutane, isopropanol, acetone, various mercaptans, various halogenated hydrocarbons such as carbon tetrachloride, and cyclohexane.

The amount of the chain transfer agent used may be appropriately selected depending on the target molecular weight of the polymer, the type of the chain transfer agent to be used, and the type and the amount of the initiator to be used, but is usually 1 to 50,000 ppm, and preferably 1 to 20,000 ppm, with respect to the total amount of fluoromonomer to be supplied.

The chain transfer agent may be added to the reaction vessel at once before initiation of the polymerization, may be added at once after initiation of the polymerization, may be added in multiple portions during the polymerization, or may be added continuously during the polymerization.

In the polymerization step, in addition to the hydrocarbon surfactant and a compound having a surfactant function used as appropriate, an additive may also be used to stabilize the compounds. Examples of the additives include a buffer, a pH adjuster, a stabilizing aid, and a dispersion stabilizer.

The stabilizing aid is preferably paraffin wax, fluorine-based oil, fluorine-based solvent, silicone oil, or the like. One stabilizing aid may be used alone, or two or more stabilizing aids may be used in combination. The stabilizing aid is more preferably paraffin wax. The paraffin wax may be in the foam of liquid, semi-solid, or solid at room temperature, and is preferably a saturated hydrocarbon having 12 or more carbon atoms. The melting point of paraffin wax is usually preferably from 40 to 65° C., and more preferably from 50 to 65° C.

The amount of the stabilizing aid used is preferably 0.1 to 12 mass %, and more preferably 0.1 to 8 mass %, based on the mass of the aqueous medium used. Preferably, the stabilizing aid is sufficiently hydrophobic to be completely separated from the PTFE aqueous emulsion after emulsion polymerization of TFE, and does not serve as a contaminating component.

The polymerization step may include (i) polymerizing TFE in an aqueous medium in the presence of a hydrocarbon surfactant to produce an aqueous dispersion of PTFE (A) particles and (ii) polymerizing the TFE onto PTFE (A) particles serving as seeds in the aqueous dispersion of PTFE (A) particles.

The PTFE aqueous dispersion obtained by the polymerization step usually contains a hydrocarbon surfactant. The content of the hydrocarbon surfactant in the PTFE aqueous dispersion is not limited, but is preferably 0.0001 to 10.0 mass % with respect to 100 mass % of the PTFE aqueous dispersion. Less than 0.0001 mass % of the surfactant may cause poor dispersion stability. More than 10.0 mass % thereof may fail to give a dispersing effect corresponding to the amount thereof, and thus is impractical. The lower limit of the content of the surfactant is more preferably 0.001 mass %, still more preferably 0.01 mass %, and particularly preferably 0.07 mass %. The upper limit thereof is more preferably 8.5 mass %, still more preferably 1.0 mass %, still further preferably 0.90 mass %, even more preferably 0.46 mass %, and particularly preferably 0.32 mass %.

After the polymerization step and before the coagulation step or during the coagulation step, a pigment or various fillers for improving mechanical properties may be added. Thereby, a PTFE powder containing a pigment and various fillers is obtained.

The PTFE powder obtained by the production method of the present invention is preferably used for molding, and suitable applications include hydraulic systems for aircraft, automobiles, and the like, tubes for fuel systems, flexible hoses for chemicals, steam, and the like, and electric wire coating applications.

The PTFE powder obtained by the production method of the present invention may also be used as a processing aid, for example. When used as a processing aid, the PTFE powder is mixed with a host polymer, for example, to improve the melt strength during melt processing of the host polymer, as well as the mechanical strength, electrical characteristics, flame retardancy, anti-drop performance during combustion, and slidability of the resulting polymer. The PTFE powder may be compounded with a resin other than PTFE and then used as a processing aid.

The PTFE powder obtained by the production method of the present invention may also be used as a binder for batteries and dustproof applications.

When the PTFE powder obtained by the production method of the present invention is a high molecular weight PTFE, the PTFE powder is also useful as a raw material for a porous PTFE body (membrane). The porous PTFE body (membrane) may be obtained by, for example, paste-extruding and rolling PTFE powder, then optional semi-sintering, stretching in at least one direction (preferably roll-stretching in the rolling direction, and then stretching in the width direction by a tenter). By stretching, the PTFE easily fibrillates, and becomes a PTFE porous body (membrane) famed of nodules and fibers. This porous body (membrane) is useful as various filters, and can be preferably used as a drug solution filter, particularly as an air filter medium, for example.

When the PTFE powder obtained by the production method of the present invention is a powder of low molecular weight PTFE (also referred to as PTFE micropowder), the PTFE powder has excellent chemical stability, extremely low surface energy, and hardly causes fibrillation, and thus is suitable as an additive for the purpose of improving the lubricity and the texture of the coating surface (for example, see Japanese Patent Laid-Open No. 10-147617) for the production of plastics, inks, cosmetics, coating materials, greases, office automation equipment members, toners, or the like.

Hereinafter, specific fluorine-containing surfactants and hydrocarbon surfactants that may be used in the method for producing a PTFE powder of the present invention will be described.

The fluorine-containing surfactant is not limited, but is preferably a fluorine-containing anionic surfactant. Conventionally used perfluorooctanoic acids and their salts (for example, ammonium salts) may also be used, and examples thereof include those disclosed in U.S. Patent Application Publication No. 2007/0015864, U.S. Patent Application Publication No. 2007/0015865, U.S. Patent Application Publication No. 2007/0015866, U.S. Patent Application Publication No. 2007/0276103, U.S. Patent Application Publication No. 2007/0117914, U.S. Patent Application Publication No. 2007/0142541, U.S. Patent Application Publication No. 2008/0015319, U.S. Patent No. 3250808, U.S. Patent No. 3271341, Japanese Patent Laid-Open No. 2003-119204, International Publication No. WO2005/042593, International Publication No. WO2008/060461, International Publication No. WO2007/046377, International Publication No. WO2007/119526, International Publication No. WO2007/046482, and International Publication No. WO2007/046345.

The fluorine-containing anionic surfactant is preferably a fluorine-containing surfactant having a Log POW of 3.4 or less.

The fluorine-containing surfactant may have a Log POW of 2.5 or more, or 3.0 or more.

The above Log POW is a partition coefficient between 1-octanol and water and is represented by Log P, where P is the ratio of the concentration of fluorine-containing surfactant in octanol to the concentration of fluorine-containing surfactant in water when an octanol/water (1:1) mixture containing a fluorine-containing surfactant is phase-separated.

The octanol/water partition coefficient represented by Log POW is calculated as follows. HPLC is pertained on standard substances (heptanoic acid, octanoic acid, nonanoic acid, and decanoic acid) each having a known octanol-water partition coefficient using TOSOH ODS-120T column (φ4.6 mm×250 mm) as a column and acetonitrile/0.6 mass % HClO$_4$ aqueous solution=1/1 (vol/vol %) as an eluent at a flow rate of 1.0 ml/min, a sample amount of 300 μL, and a column temperature of 40° C., with detection light UV 210 nm. A calibration curve between the respective elution times and the known octanol-water partition coefficients is drawn, and the Log POW value is calculated from the elution time of the sample liquid in HPLC based on the calibration curve.

The fluorine-containing surfactant having a Log POW of 3.4 or less is preferably at least one fluorine-containing surfactant selected from the group consisting of:

those represented by the general formula:

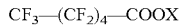

$$CF_3-(CF_2)_4-COOX$$

wherein X represents a hydrogen atom, NH$_4$, or an alkali metal;

those represented by the general formula:

$$CF_3CF_2CF_2OCF(CF_3)COOX$$

wherein X represents a hydrogen atom, NH$_4$, or an alkali metal atom;

those represented by the general formula:

$$CF_3CCF(CF_3)CF_2OCF(CF_3)COOX$$

wherein X represents a hydrogen atom, $NH_4$, or an alkali metal atom;
and
those represented by the general formula:

$$CF_3CF_2CCF_2CF_2CCF_2COOX$$

wherein X represents a hydrogen atom, $NH_4$, or an alkali metal atom.

The fluorine-containing surfactant having a Log POW of 3.4 or less may also be any of those represented by the general formula:

$$CF_3OCF_2CF_2OCF_2CF_2COOX$$

wherein X represents a hydrogen atom, $NH_4$, or an alkali metal atom;
and
those represented by the general formula:

$$CF_3CCF_2CF_2CF_2CCHFCF_2COOX$$

wherein X represents a hydrogen atom, $NH_4$, or an alkali metal atom.

When the fluorine-containing surfactant is a salt, a counter ion constituting the salt may be an alkali metal ion or $NH_4^+$, for example, and examples of the alkali metal ion include $Na^+$ and $K^+$.

Examples of the fluorine-containing surfactant having a Log POW of 3.4 or less include $CF_3OCF(CF_3)CF_2OCF(CF_3)COOH$, $CF_3OCF(CF_3)CF_2OCF(CF_3)COONH_4$, $CF_3CF_2OCF_2CF_2OCF_2COOH$, $CF_3CF_2OCF_2CF_2OCF_2COONH_4$, $CF_3OCF_2CF_2CF_2OCHFCF_2COOH$, $CF_3OCF_2CF_2CF_2OCHFCF_2COONH_4$, $CF_3—(CF_2)_4—COOH$, $CF_3—(CF_2)_4—COONH_4$, $CF_3CF_2CF_2OCF(CF_3)COONH_4$, and $CF_3CF_2CF_2OCF(CF_3)COOH$.

Hydrocarbon surfactants have a hydrophilic part and a hydrophobic part on the same molecule. These may be cationic, nonionic, or anionic.

Typical cationic surfactants contain a positively charged hydrophilic part such as an alkylated ammonium halide such as an alkylated ammonium bromide and a hydrophobic part such as a long chain fatty acid.

Typical anionic surfactants contain a hydrophilic part such as a carboxylate, sulfonate, or sulfate and a hydrophobic part that is a long chain hydrocarbon part such as alkyl.

Typical nonionic surfactants do not contain charged groups and have a hydrophobic part that is a long chain hydrocarbon. The hydrophilic part of the nonionic surfactants contains a water-soluble functional group such as chains of ethylene ether derived from polymerization with ethylene oxide.

Examples of nonionic hydrocarbon surfactants

Polyoxyethylene alkyl ether, polyoxyethylene alkyl phenyl ether, polyoxyethylene alkyl ester, sorbitan alkyl ester, polyoxyethylene sorbitan alkyl ester, glycerol ester, and derivatives thereof.

Specific examples of polyoxyethylene alkyl ethers: polyoxyethylene lauryl ether, polyoxyethylene cetyl ether, polyoxyethylene stearyl ether, polyoxyethylene oleyl ether, polyoxyethylene behenyl ether and the like.

Specific examples of polyoxyethylene alkyl phenyl ether: polyoxyethylene nonyl phenyl ether, polyoxyethylene octyl phenyl ether and the like.

Specific examples of polyoxyethylene alkyl esters: polyethylene glycol monolaurate, polyethylene glycol monooleate, polyethylene glycol monostearate and the like.

Specific examples of sorbitan alkyl esters: polyoxyethylene sorbitan monolaurate, polyoxyethylene sorbitan monopalmitate, polyoxyethylene sorbitan monostearate, polyoxyethylene sorbitan monooleate and the like.

Specific examples of polyoxyethylene sorbitan alkyl ester: polyoxyethylene sorbitan monolaurate, polyoxyethylene sorbitan monopalmitate, polyoxyethylene sorbitan monostearate and the like.

Specific examples of glycerol esters: glycerol monomyristate, glycerol monostearate, glycerol monooleate and the like.

Specific examples of the above derivatives: polyoxyethylene alkylamine, polyoxyethylene alkylphenyl-formaldehyde condensate, polyoxyethylene alkyl ether phosphate and the like.

The ethers and esters may have an HLB value of 10 to 18.

Examples of the nonionic hydrocarbon surfactant include Triton (R) Triton (R) X series (X15, X45, X100, etc.), Tergitol (R) 15-S series, Tergitol (R) TMN series (TMN-6, TMN-10, TMN-100, etc.), and Tergitol (R) L series manufactured by Dow Chemical Company, and Pluronic (R) R series (31R1, 17R2, 10R5, 25R4 (m to 22, n to 23)), and Iconol (R) TDA series (TDA-6, TDA-9, TDA-10) manufactured by BASF.

Examples of the anionic hydrocarbon surfactant include Versatic (R) 10 of Resolution Performance Products, and Avanel S series (S-70, S-74, etc.) manufactured by BASF.

Examples of the hydrocarbon surfactant include an anionic surfactant represented by R-L-M wherein R is a linear or branched alkyl group having 1 or more carbon atoms and optionally having a substituent or a cyclic alkyl group having 3 or more carbon atoms and optionally having a substituent, and optionally contains a monovalent or divalent heterocyclic ring or optionally foams a ring when containing 3 or more carbon atoms, L is $—ArSO_3$, $—SO_3^-$, $—SO_4^-$, $—PO_3^-$, or $—COO^-$, M is $H^+$, $K^+$, or $NH_4^+$, and $—ArSO_3^-$ is an aryl sulfonate.

Specifically, examples thereof include those represented by $CH_3—(CH_2)_n-L-M$, wherein n is an integer of 6 to 17, and L and M are the same as defined above.

A mixture of the anionic surfactants where R is an alkyl group having 12 to 16 carbon atoms and L is sulfate or sodium dodecyl sulfate (SDS) may also be used, for example.

Examples of the hydrocarbon surfactant include an anionic surfactant represented by $R^6(-L-M)_2$ wherein $R^6$ is a linear or branched alkylene group having 1 or more carbon atoms and optionally having a substituent or a cyclic alkylene group having 3 or more carbon atoms and optionally having a substituent, and optionally contains a monovalent or divalent heterocyclic ring or optionally forms a ring when containing 3 or more carbon atoms, L is $—ArSO_3^-$, $—SO_3^-$, $—SO_4—$, $—PO_3^-$, or $—COO^-$, M is $H^+$, $Na^+$, $K^+$, or $NH_4^+$, $—ArSO_3^-$ is an aryl sulfonate, and a and b are each an integer of 1 or more.

Examples of the hydrocarbon surfactant include an anionic surfactant represented by $R^7(-L-M)_3$ wherein $R^7$ is a linear or branched alkylidyne group having 1 or more carbon atoms and optionally having a substituent or a cyclic alkylidyne group having 3 or more carbon atoms and optionally having a substituent, and optionally contains a monovalent or divalent heterocyclic ring or optionally faults a ring when containing 3 or more carbon atoms, L is $—ArSO_3^-$, $—SO_3^-$, $—SO_4—$, $—PO_3^-$, or $—COO^-$, M is $H^+$, $Na^+$, $K^+$, or $NH_4^-$, $—ArSO_3^-$ is an aryl sulfonate, and a and b are each an integer of 1 or more.

As used herein, unless otherwise specified, the term "substituent" means a group which can perform substitution. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxyamino group, a carbamoylamino group, a sulfamoyl amino group, a halogen atom, a sulfamoyl carbamoyl group, a carbamoyl sulfamoyl group, a dialiphatic oxyphosphinyl group, and a diaromatic oxyphosphinyl group.

Examples of the siloxane hydrocarbon surfactant include those described in Silicone Surfactants, R. M. Hill, Marcel Dekker, Inc., ISBN: 0-8247-00104. The structure of the siloxane surfactant contains distinct hydrophobic and hydrophilic parts. The hydrophobic part contains one or more dihydrocarbylsiloxane units, wherein the substituents on the silicone atom are all hydrocarbons.

When the carbon atoms of the hydrocarbyl group are to be replaced with a halogen such as fluorine, they are completely replaced with hydrogen atoms, and thus these siloxane surfactants can also be regarded as hydrocarbon surfactants. In other words, the monovalent substituent on carbon atoms of the hydrocarbyl group is hydrogen.

The hydrophilic part of the siloxane surfactant optionally contains one or more polar parts, such as sulfate, sulfonate, phosphonate, phosphate, carboxylate, carbonate, sulfosuccinate, taurate (as free acid, salt or ester), phosphine oxide, betaine, betaine copolyol, ionic groups such as quaternary ammonium salts. The ionic hydrophobic part also optionally contains an ionically functionalized siloxane graft.

Examples of such siloxane surfactants include polydimethylsiloxane-graft-(meth)acrylates, polydimethylsiloxane-graft-polyacrylate salts, and polydimethylsiloxane-grafted quaternary amines.

The polar part of the hydrophilic part of the siloxane surfactant optionally contains polyethers such as polyethylene oxide (PEO) and mixed polyethylene oxide/propylene oxide polyethers (PEO/PPO; mono- and disaccharides; and nonionic groups famed by a water-soluble heterocyclic ring such as pyrrolidinone. The ratio of ethylene oxide to propylene oxide (EO/PO) in the mixed polyethylene oxide/propylene oxide polyether may vary.

The hydrophilic part of the siloxane surfactant may also include a combination of ionic and nonionic parts. Examples of such parts include ionically terminally functionalized or randomly functionalized polyethers or polyols. Preferred for the implementation of the present invention are siloxanes having nonionic parts, that is, non-ionic siloxane surfactants.

The arrangement of the hydrophobic and hydrophilic parts in the structure of the siloxane surfactant may take the forms of diblock polymer (AB), triblock polymer (ABA) (here, "B" represents the siloxane part of the molecule) or multiblock polymer. Alternatively, the siloxane surfactant may contain a graft polymer.

Siloxane surfactants are also disclosed in U.S. Pat. No. 6,841,616.

Examples of the siloxane-based anionic hydrocarbon surfactant include Noveon (R) from Lubrizol Advanced Materials, Inc. and SilSense (TM) PE-100 silicone, SilSense (TM) CA-1 silicone available from Consumer Specialties, Inc.

Examples of the anionic hydrocarbon surfactant include a sulfosuccinate surfactant Lanzopol (R) K8300 from Akzo Nobel Surface Chemistry LLC.

Examples of the sulfosuccinate hydrocarbon surfactant include diisodecyl sodium sulfosuccinate, (Emulsogen (R) SB10 from Clariant), and diisotridecyl sodium sulfosuccinate (Polirol (R) TR/LNA from Cesapinia Chemicals).

Examples of the hydrocarbon surfactant include PolyFox (R) surfactants (PolyFox (TM) PF-156A, PolyFox (TM) PF-136A, etc.) from Omnova Solutions, Inc.

Examples of the hydrocarbon surfactant include at least one selected from the group consisting of:
a surfactant (a) represented by the following formula (a):

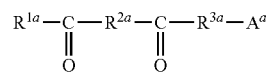

wherein $R^{1a}$ is a linear or branched alkyl group having 1 or more carbon atoms or a cyclic alkyl group having 3 or more carbon atoms, where a hydrogen atom bonded to a carbon atom is optionally replaced with a hydroxy group or a monovalent organic group containing an ester bond, and $R^{1a}$ optionally contains a carbonyl group when containing 2 or more carbon atoms, and optionally contains a monovalent or divalent heterocyclic ring or optionally forms a ring when containing 3 or more carbon atoms; $R^{2a}$ and $R^{3a}$ are each independently a single bond or a divalent linking group; $R^{2a}$, and $R^{3a}$ have 5 or more carbon atoms in total; $A^a$ is —COOX$^a$ or —SO$_3$X$_a$, where X$^a$ is H, a metal atom, NR$^{4a}_4$, imidazolium optionally having a substituent, pyridinium optionally having a substituent, or phosphonium optionally having a substituent, where $R^{4a}$s are each H or an organic group and are the same as or different from each other; and any two of $R^{1a}$, $R^{2a}$, and $R^{3a}$ are optionally bonded to each other to form a ring; and
a surfactant (b) represented by the following formula (b):

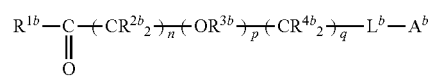

wherein $R^{1b}$ is a linear or branched alkyl group having 1 or more carbon atoms and optionally having a substituent or a cyclic alkyl group having 3 or more carbon atoms and optionally having a substituent, and optionally contains a monovalent or divalent heterocyclic ring or optionally foams a ring when containing 3 or more carbon atoms; $R^{2b}$ and $R^{4b}$ are each independently H or a substituent; $R^{3b}$ is an alkylene group having 1 to 10 carbon atoms and optionally having a substituent; n is an integer of 1 or more; p and q are each independently an integer of 0 or more; $A^b$ is —SO$_3$X$^b$ or —COOX$^b$, where X$^b$ is H, a metal atom, NR$^{5b}_4$, imidazolium optionally having a substituent, pyridinium optionally having a substituent, or phosphonium optionally having a substituent, where $R^{5b}$s are each H or an organic group and are the same as or different from each other; any two of $R^{1b}$, $R^{2b}$, $R^{3b}$, and $R^{4b}$ are optionally bonded to each other to form a ring; $L^b$ is a single bond, —$CO_2$—B—*, —OCO—B—*, —$CONR^{6b}$—B—*, —$NR^{6b}CO$—B—*, or —CO— other than the carbonyl groups in-$CO_2$—B—, —OCO—B—, —$CONR^{6b}$—B—, —$NR^{6b}CO$—B—, where B is a single bond or an alkylene group having 1 to 10 carbon atoms and optionally having a substituent, $R^{6b}$ is H or an alkyl group having 1 to 4 carbon atoms and optionally having a substituent; the alkylene group more preferably has 1 to 5 carbon atoms; $R^{6b}$ is more preferably H or a methyl group; and * indicates the bond to $-A^b$ in the formula.

The surfactant (a) will be described.

In the formula (a), $R^{1a}$ is a linear or branched alkyl group having 1 or more carbon atoms or a cyclic alkyl group having 3 or more carbon atoms.

When containing 3 or more carbon atoms, the alkyl group optionally contains a carbonyl group (—C(=O)—) between two carbon atoms. When containing 2 or more carbon atoms, the alkyl group optionally contains the carbonyl group at an end of the alkyl group. That is, an acyl group such as an acetyl group represented by $CH_3$—C(=O)— is also optionally contained in the alkyl group.

When containing 3 or more carbon atoms, the alkyl group optionally contains a monovalent or divalent heterocyclic ring or optionally faults a ring. The heterocyclic ring is preferably an unsaturated heterocyclic ring, more preferably an oxygen-containing unsaturated heterocyclic ring, and examples thereof include a furan ring. In $R^{1a}$, a divalent heterocyclic ring may be present between two carbon atoms, or a divalent heterocyclic ring may be present at an end and be bonded to-C(=O)—, or a monovalent heterocyclic ring may be present at an end of the alkyl group.

As used herein, the "number of carbon atoms" of the alkyl group includes the number of carbon atoms constituting the carbonyl group and the number of carbon atoms constituting the heterocyclic ring. For example, the group represented by $CH_3$—C(=O)—$CH_2$— has 3 carbon atoms, the group represented by $CH_3$—C(=O)—$C_2H_4$—C(=O)—$C_2H_4$— has 7 carbon atoms, and the group represented by $CH_3$—C(=O)-has 2 carbon atoms.

In the alkyl group, a hydrogen atom bonded to a carbon atom is optionally replaced with a functional group such as a hydroxy group (—OH) or a monovalent organic group containing an ester bond. Still, it is preferably not replaced with any functional group.

Examples of the monovalent organic group containing an ester bond include a group represented by the formula: —OC(=O)$R^{101a}$, wherein $R^{101a}$ is an alkyl group.

In the alkyl group, 75% or less of the hydrogen atoms bonded to any of the carbon atoms may be replaced with halogen atoms, 50% or less thereof may be replaced with halogen atoms, or 25% or less thereof may be replaced with halogen atoms. The alkyl group is preferably a non-halogenated alkyl group containing no halogen atoms such as fluorine atoms and chlorine atoms.

In the formula (a), $R^{2a}$ and $R^{3a}$ are each independently a single bond or a divalent linking group.

$R^{2a}$ and $R^{3a}$ are preferably each independently a single bond or a linear or branched alkylene group having 1 or more carbon atoms or a cyclic alkylene group having 3 or more carbon atoms.

The alkylene group constituting $R^{2a}$ and $R^{3a}$ is preferably free of a carbonyl group.

In the alkylene group, a hydrogen atom bonded to a carbon atom is optionally replaced with a functional group such as a hydroxy group (—OH) or a monovalent organic group containing an ester bond. Still, it is preferably not replaced with any functional group.

Examples of the monovalent organic group containing an ester bond include a group represented by the formula: —OC(=O)—$R^{102a}$, wherein $R^{102a}$ is an alkyl group.

In the alkylene group, 75% or less of the hydrogen atoms bonded to any of the carbon atoms may be replaced with halogen atoms, 50% or less thereof may be replaced with halogen atoms, or 25% or less thereof may be replaced with halogen atoms. The alkylene group is preferably a non-halogenated alkylene group containing no halogen atoms such as fluorine atoms and chlorine atoms.

$R^{1a}$, $R^{2a}$, and $R^{3a}$ have 5 or more carbon atoms in total. The total number of carbon atoms is preferably 7 or more, and more preferably 9 or more, and preferably 20 or less, more preferably 18 or less, and still more preferably 15 or less.

Any two of $R^{1a}$, $R^{2a}$, and $R^{3a}$ are optionally bonded to each other to foam a ring.

In the formula (a), in the formula, $A^a$ is —$COOX^a$ or —$SO_3X^a$, where $X^a$ is H, a metal atom, $NR^{4a}_4$, imidazolium optionally having a substituent, pyridinium optionally having a substituent, or phosphonium optionally having a substituent, where $R^{4a}$s are each H or an organic group and are the same as or different from each other. $R^{4a}$ is preferably H or an organic group having 1 to 10 carbon atoms, and more preferably H or an organic group having 1 to 4 carbon atoms. Examples of the metal atom include alkali metals (Group 1) and alkaline earth metals (Group 2), and preferred is Na, K, or Li.

$X^a$ is preferably H, an alkali metal (Group 1), an alkaline earth metal (Group 2) or $NR^{4a}_4$, more preferably H, Na, K, Li, or $NH_4$ because they are easily dissolved in water, still more preferably Na, K, or $NH_4$ because they are more easily dissolved in water, particularly preferably Na or $NH_4$, and most preferably $NH_4$ because it can be easily removed. When $X^a$ is $NH_4$, the surfactant has excellent solubility in an aqueous medium and the metal component is less likely to remain in the PTFE or the final product.

$R^{1a}$ is preferably a linear or branched alkyl group having 1 to 8 carbon atoms free of a carbonyl group, a cyclic alkyl group having 3 to 8 carbon atoms free of a carbonyl group, a linear or branched alkyl group having 2 to 45 carbon atoms containing 1 to 10 carbonyl groups, a cyclic alkyl group having 3 to 45 carbon atoms containing a carbonyl group, or an alkyl group having 3 to 45 carbon atoms containing a monovalent or divalent heterocyclic ring.

$R^{1a}$ is more preferably a group represented by the following formula:

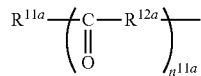

wherein $n^{11a}$ is an integer of 0 to 10, $R^{11a}$ is a linear or branched alkyl group having 1 to 5 carbon atoms or a cyclic alkyl group having 3 to 5 carbon atoms, and $R^{12a}$ is an alkylene group having 0 to 3 carbon atoms; and when $n^{11a}$ is an integer of 2 to 10, $R^{12a}$s may be the same or different.

$n^{11a}$ is preferably an integer of 0 to 5, more preferably an integer of 0 to 3, and still more preferably an integer of 1 to 3.

The alkyl group for $R^{11a}$ is preferably free of a carbonyl group.

In the alkyl group for $R^{11a}$, a hydrogen atom bonded to a carbon atom is optionally replaced with a functional group such as a hydroxy group (—OH) or a monovalent organic group containing an ester bond. Still, it is preferably not replaced with any functional group.

Examples of the monovalent organic group containing an ester bond include a group represented by the formula: —OC(=O)—$R^{103a}$, wherein $R^{103a}$ is an alkyl group.

In the alkyl group for $R^{11a}$, 75% or less of the hydrogen atoms bonded to any of the carbon atoms may be replaced with halogen atoms, 50% or less thereof may be replaced with halogen atoms, or 25% or less thereof may be replaced with halogen atoms. The alkyl group is preferably a non-halogenated alkyl group containing no halogen atoms such as fluorine atoms and chlorine atoms.

$R^{12a}$ is an alkylene group having 0 to 3 carbon atoms. The number of carbon atoms is preferably 1 to 3.

The alkylene group for $R^{12a}$ may be linear or branched.

The alkylene group for $R^{12a}$ is preferably free of a carbonyl group.

$R^{12a}$ is more preferably an ethylene group (—$C_2H_4$—) or a propylene group (—$C_3H_6$—).

In the alkylene group for $R^{12a}$, a hydrogen atom bonded to a carbon atom is optionally replaced with a functional group such as a hydroxy group (—OH) or a monovalent organic group containing an ester bond. Still, it is preferably not replaced with any functional group.

Examples of the monovalent organic group containing an ester bond include a group represented by the formula: —OC(=O)—$R^{104a}$, wherein $R^{104a}$ is an alkyl group.

In the alkylene group for $R^{12a}$, 75% or less of the hydrogen atoms bonded to any of the carbon atoms may be replaced with halogen atoms, 50% or less thereof may be replaced with halogen atoms, or 25% or less thereof may be replaced with halogen atoms. The alkylene group is preferably a non-halogenated alkylene group containing no halogen atoms such as fluorine atoms and chlorine atoms.

$R^{2a}$ and $R^{3a}$ are preferably each independently an alkylene group having 1 or more carbon atoms free of a carbonyl group, more preferably an alkylene group having 1 to 3 carbon atoms free of a carbonyl group, and still more preferably an ethylene group (—$C_2H_4$—) or propylene group (—$C_3H_6$—).

Next, the surfactant (b) will be described.

In the formula (b), $R^{1b}$ represents a linear or branched alkyl group having 1 or more carbon atoms and optionally having a substituent or a cyclic alkyl group having 3 or more carbon atoms and optionally having a substituent.

When containing 3 or more carbon atoms, the alkyl group optionally contains a monovalent or divalent heterocyclic ring or optionally forms a ring. The heterocyclic ring is preferably an unsaturated heterocyclic ring, more preferably an oxygen-containing unsaturated heterocyclic ring, and examples thereof include a furan ring. In $R^{1b}$, a divalent heterocyclic ring may be present between two carbon atoms, or a divalent heterocyclic ring may be present at an end and be bonded to —C(=O)—, or a monovalent heterocyclic ring may be present at an end of the alkyl group.

As used herein, the "number of carbon atoms" of the alkyl group includes the number of carbon atoms constituting the heterocyclic ring.

The substituent which the alkyl group optionally has as $R^{1b}$ is preferably a halogen atom, a linear or branched alkyl group having 1 to 10 carbon atoms or a cyclic alkyl group having 3 to 10 carbon atoms, or a hydroxy group, and particularly preferably a methyl group or an ethyl group.

The alkylene group for $R^{1b}$ is preferably free of a carbonyl group.

In the alkyl group, 75% or less of the hydrogen atoms bonded to any of the carbon atoms may be replaced with halogen atoms, 50% or less thereof may be replaced with halogen atoms, or 25% or less thereof may be replaced with halogen atoms. The alkyl group is preferably a non-halogenated alkyl group containing no halogen atoms such as fluorine atoms and chlorine atoms.

The alkyl group preferably does not have any substituents.

$R^{1b}$ is preferably a linear or branched alkyl group having 1 to 10 carbon atoms and optionally having a substituent or a cyclic alkyl group having 3 to 10 carbon atoms and optionally having a substituent, more preferably a linear or branched alkyl group having 1 to 10 carbon atoms free of a carbonyl group or a cyclic alkyl group having 3 to 10 carbon atoms free of a carbonyl group, still more preferably a linear or branched alkyl group having 1 to 10 carbon atoms having no substituent, and still further preferably a linear or branched alkyl group having 1 to 3 carbon atoms having no substituent, particularly preferably a methyl group (—$CH_3$) or an ethyl group (—$C_2H_5$), and most preferably a methyl group (—$CH_3$).

In the formula (b), $R^{2b}$ and $R^{4b}$ are each independently H or a substituent. Multiple $R^{2b}$s may be the same as or different from each other and multiple $R^{4b}$s may be the same as or different from each other.

The substituent for each of $R^{2b}$ and $R^{4b}$ is preferably a halogen atom, a linear or branched alkyl group having 1 to 10 carbon atoms or a cyclic alkyl group having 3 to 10 carbon atoms, or a hydroxy group, and particularly preferably a methyl group or an ethyl group.

The alkylene group for $R^{2b}$ and $R^{4b}$ is preferably free of a carbonyl group.

In the alkyl group, 75% or less of the hydrogen atoms bonded to any of the carbon atoms may be replaced with halogen atoms, 50% or less thereof may be replaced with halogen atoms, or 25% or less thereof may be replaced with halogen atoms. The alkyl group is preferably a non-halogenated alkyl group containing no halogen atoms such as fluorine atoms and chlorine atoms.

The alkyl group preferably does not have any substituents.

The alkyl group for $R^{2b}$ and $R^{4b}$ is preferably a linear or branched alkyl group having 1 to 10 carbon atoms free of a carbonyl group or a cyclic alkyl group having 3 to 10 carbon atoms free of a carbonyl group, more preferably a linear or branched alkyl group having 1 to 10 carbon atoms free of a carbonyl group, still more preferably a linear or branched alkyl group having 1 to 3 carbon atoms having no substituent, and particularly preferably a methyl group (—$CH_3$) or an ethyl group (—$C_2H_5$).

$R^{2b}$ and $R^{4b}$ are preferably each independently H or a linear or branched alkyl group having 1 to 10 carbon atoms free of a carbonyl group, and more preferably H or a linear or branched alkyl group having 1 to 3 carbon atoms having no substituent, still more preferably H, a methyl group (—$CH_3$) or an ethyl group (—$C_2H_5$), and particularly preferably H.

In the formula (b), $R^{3b}$ is an alkylene group having 1 to 10 carbon atoms and optionally having a substituent. When multiple $R^{3b}$s are present, they may be the same as or different from each other.

The alkylene group is preferably free of a carbonyl group.

In the alkylene group, 75% or less of the hydrogen atoms bonded to any of the carbon atoms may be replaced with halogen atoms, 50% or less thereof may be replaced with halogen atoms, or 25% or less thereof may be replaced with halogen atoms. The alkyl group is preferably a non-halogenated alkyl group free of halogen atoms such as fluorine atoms and chlorine atoms.

The alkylene group preferably does not have any substituents.

The alkylene group is preferably a linear or branched alkylene group having 1 to 10 carbon atoms and optionally having a substituent or a cyclic alkylene group having 3 to 10 carbon atoms and optionally having a substituent, preferably a linear or branched alkylene group having 1 to 10 carbon atoms free of a carbonyl group or a cyclic alkylene group having 3 to 10 carbon atoms free of a carbonyl group, more preferably a linear or branched alkylene group having 1 to 10 carbon atoms having no substituent, and still more preferably a methylene group (—$CH_2$—), an ethylene group (—$C_2H_4$—), an isopropylene group (—$CH(CH_3)CH_2$—), or a propylene group (—$C_3H_6$—).

Any two of $R^{1b}$, $R^{2b}$, $R^{3b}$, and $R^{4b}$ are optionally bonded to each other to foam a ring.

In the formula (b), n is an integer of 1 or more. n is preferably an integer of 1 to 40, more preferably an integer of 1 to 30, and still more preferably an integer of 5 to 25.

In the formula (b), p and q are each independently an integer of 0 or more. p is preferably an integer of 0 to 10, and more preferably 0 or 1. q is preferably an integer of 0 to 10, and more preferably an integer of 0 to 5.

The total of n, p, and q is preferably an integer of 6 or more. The total of n, p, and q is more preferably an integer of 8 or more. The total of n, p, and q is also preferably an integer of 60 or less, more preferably an integer of 50 or less, and still more preferably an integer of 40 or less.

In the formula (b), $A^b$ is —$SO_3X^b$ or —$COOX^b$, where $X^b$ is H, a metal atom, $NR^{5b}_4$, imidazolium optionally having a substituent, pyridinium optionally having a substituent, or phosphonium optionally having a substituent, where $R^{5b}$s are each H or an organic group and are the same as or different from each other. $R^{5b}$ is preferably H or an organic group having 1 to 10 carbon atoms, and more preferably H or an organic group having 1 to 4 carbon atoms. Examples of the metal atom include alkali metals (Group 1) and alkaline earth metals (Group 2), and preferred is Na, K, or Li. $X^b$ may be a metal atom or $NR^5_4$ where $R^{5b}$ is defined as described above.

$X^b$ is preferably H, an alkali metal (Group 1), an alkaline earth metal (Group 2) or $NR^{5b}_4$, more preferably H, Na, K, Li, or $NH_4$ because they are easily dissolved in water, still more preferably Na, K, or $NH_4$ because they are more easily dissolved in water, particularly preferably Na or $NH_4$, and most preferably $NH_4$ because it can be easily removed. When $X^b$ is $NH_4$, the surfactant has excellent solubility in an aqueous medium and the metal component is less likely to remain in the fluoropolymer or the final product.

In the formula (p), $L^b$ is a single bond, —$CO_2$—B—*, —OCO—B—*, —$CONR^{6b}$—B—*, —$NR^{6b}CO$—B—*, or —CO— other than the carbonyl groups in-$CO_2$—B—, —OCO—B—, —$CONR^{6b}$—B—, —$NR^{6b}CO$—B—, where B is a single bond or an alkylene group having 1 to 10 carbon atoms and optionally having a substituent, $R^{6b}$ is H or an alkyl group having 1 to 4 carbon atoms and optionally having a substituent. The alkylene group more preferably has 1 to 5 carbon atoms. $R^{6b}$ is more preferably H or a methyl group. * indicates the bond to -$A^b$ in the formula.

$L^b$ is preferably a single bond.

The surfactant preferably has a $^1$H-NMR spectrum in which all peak intensities observed in a chemical shift range of 2.0 to 5.0 ppm to give an integral of 10% or more.

The surfactant preferably has a $^1$H-NMR spectrum in which all peak intensities observed in a chemical shift range of 2.0 to 5.0 ppm give an integral within the above range. In this case, the surfactant preferably has a ketone structure in the molecule.

In the surfactant, the integral is more preferably 15 or more, preferably 95 or less, more preferably 80 or less, and still more preferably 70 or less.

The integral is determined using a heavy water solvent at room temperature. The heavy water content is adjusted to 4.79 ppm.

The surfactant (a) is a novel compound and may be produced, for example, by the following production method.

The surfactant (a) may be produced by a production method including:

a step (11a) of reacting a compound (10a) represented by the formula:

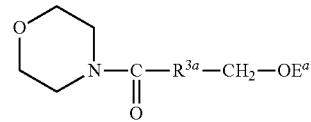

wherein $R^{3a}$ is defined as described above, and $E^a$ is a leaving group, lithium, and a chlorosilane compound represented by the formula: $R^{201a}_3Si$—Cl wherein $R^{201a}$s are each independently an alkyl group or an aryl group, to provide a compound (11a) represented by the formula:

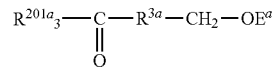

wherein $R^{3a}$, $R^{201a}$, and $E^a$ are defined as described above;

a step (12a) of reacting the compound (11a) and an olefin represented by the formula:

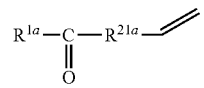

wherein $R^{1a}$ is defined as described above, and $R^{21a}$ is a single bond or a divalent linking group, to provide a compound (12a) represented by the formula:

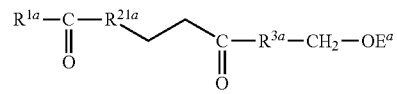

wherein $R^{1a}$, $R^{21a}$, $R^{3a}$, and $E^a$ are defined as described above;

a step (13a) of eliminating the leaving group in the compound (12a) to provide a compound (13a) represented by the formula:

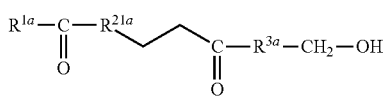

wherein $R^{1a}$, $R^{21a}$, and $R^{3a}$ are defined as described above; and a step (14a) of oxidizing the compound (13a) to provide a compound (14a) represented by the formula:

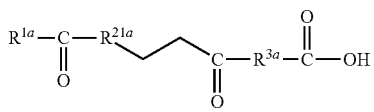

wherein $R^{1a}$, $R^{21a}$, and $R^{3a}$ are defined as described above.

When $R^{1a}$ contains a furan ring, the furan ring may be cleaved with an acid and converted into a dicarbonyl derivative, for example. Examples of the acid include acetic acid, hydrochloric acid, and p-toluenesulfone. The same applies to other production methods described later.

$E^a$ represents a leaving group. Examples of the leaving group include a tert-butyldimethylsilyl (TBS) group, a triethylsilyl (TES) group, a triisopropylsilyl (TIPS) group, a tert-butyldiphenylsilyl (TBDPS) group, and a benzyl (Bn) group. The same applies to other production methods described later.

$R^{21a}$ is preferably a single bond or a linear or branched alkylene group having 1 or more carbon atoms.

An example of the chlorosilane compound is as shown below.

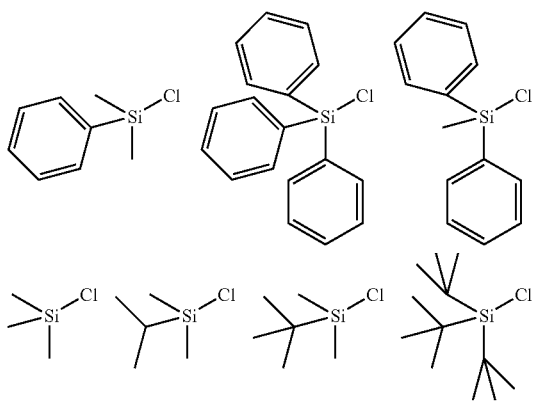

Any of the reactions in the step (11a) may be pertained in a solvent. The solvent to be used may be an organic solvent, including aprotic polar solvents, and specific examples thereof include ethers.

Regarding the reaction ratio between the compound (11a) and the olefin in the step (12a), the olefin may be used in an amount of 1 to 2 mol with respect to 1 mol of the compound (11a), so as to improve the yield and to reduce the waste.

The reaction in the step (12a) may be performed in a solvent in the presence of a thiazolium salt and a base.

Examples of the thiazolium salt include 3-ethyl-5-(2-hydroxyethyl)-4-methylthiazolium bromide and 3-benzyl-5-(2-hydroxyethyl)-4-methylthiazolium chloride.

Examples of the base include 1,8-diazabicyclo[5.4.0]-7-undecene and triethylamine.

The solvent to be used may be an organic solvent, including aprotic polar solvents, and specific examples thereof include ethers.

The elimination reaction for the leaving group in the step (13a) may be pertained using a fluoride ion or an acid. Examples of methods of eliminating the leaving group include a method using hydrofluoric acid; a method using an amine complex of hydrogen fluoride such as pyridine-nHF or triethylamine-nHF; a method using an inorganic salt such as cesium fluoride, potassium fluoride, lithium tetrafluoroborate ($LiBF_4$), or ammonium fluoride; and a method using an organic salt such as tetrabutylammonium fluoride (TBAF).

The elimination reaction for the leaving group in the step (13a) may be pertained in a polar solvent. The solvent to be used may be an organic solvent, including aprotic polar solvents, and specific examples thereof include ethers.

The oxidation in the step (14a) may be pertained in a solvent in the presence of sodium chlorite.

Examples of the solvent that may be used include alcohols such as methanol, ethanol, 1-propanol, isopropanol, 1-butanol, and tert-butyl alcohol; and water. A disodium hydrogen phosphate solution may be used as the buffer, for example.

The compound (14a) may be contacted with an alkali to convert —COOH to a salt faint. Examples of the alkali include sodium hydroxide, potassium hydroxide, lithium hydroxide, and ammonia, and an aqueous solution of ammonia may be used, for example.

The resulting compounds may be subjected to any of evaporation of a solvent or operations such as distillation and purification after the respective steps, whereby the purity of each compound may be increased.

The surfactant (a) may be produced by a production method including:

a step (21a) of reacting a ketone represented by the formula:

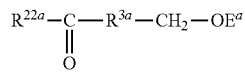

wherein $R^{3a}$ is defined as described above, $R^{22a}$ is a monovalent organic group, and $E^a$ is a leaving group, and a carboxylate represented by the formula:

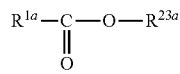

wherein $R^{1a}$ is defined as described above, and $R^{23a}$ is a monovalent organic group, to provide a compound (21a) represented by the formula:

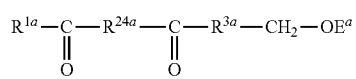

wherein $R^{1a}$, $R^{3a}$, and $E^a$ are defined as described above; and $R^{24a}$ is a single bond or a divalent linking group;

a step (22a) of eliminating the leaving group in the compound (21a) to provide a compound (22a) represented by the formula:

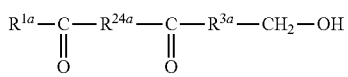

wherein $R^{1a}$, $R^{24a}$, and $R^{3a}$ are defined as described above; and a step (23a) of oxidizing the compound (22a) to provide a compound (22a) represented by the formula:

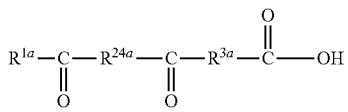

wherein $R^{1a}$, $R^{24a}$, and $R^{3a}$ are defined as described above.

$R^{22a}$ is preferably a linear or branched alkyl group having 1 or more carbon atoms, and more preferably a methyl group.

$R^{23a}$ is preferably a linear or branched alkyl group having 1 or more carbon atoms, and more preferably a methyl group.

$R^{24a}$ is preferably a linear or branched alkylene group having 1 or more carbon atoms, and more preferably a methylene group (—$CH_2$—).

The reaction in the step (21a) may be performed in a solvent in the presence of a base.

Examples of the base include sodium amide, sodium hydride, sodium methoxide, and sodium ethoxide.

The solvent to be used may be an organic solvent, including aprotic polar solvents, and specific examples thereof include ethers.

The elimination reaction for the leaving group in the step (22a) may be pertained using a fluoride ion or an acid. Examples of methods of eliminating the leaving group include a method using hydrofluoric acid; a method using an amine complex of hydrogen fluoride such as pyridine-nHF or triethylamine-nHF; a method using an inorganic salt such as cesium fluoride, potassium fluoride, lithium tetrafluoroborate (LiBF$_4$), or ammonium fluoride; and a method using an organic salt such as tetrabutylammonium fluoride (TBAF).

The elimination reaction for the leaving group in the step (22a) may be pertained in a solvent. The solvent to be used may be an organic solvent, including aprotic polar solvents, and specific examples thereof include ethers.

The oxidation in the step (23a) may be pertained in a solvent in the presence of sodium chlorite.

The solvent to be used may be alcohol or water, for example. A disodium hydrogen phosphate solution may be used as the buffer, for example.

The compound (23a) may be contacted with an alkali to convert —COOH to a salt faun. Examples of the alkali include sodium hydroxide, potassium hydroxide, lithium hydroxide, and ammonia, and an aqueous solution of ammonia may be used, for example.

The resulting compounds may be subjected to any of evaporation of a solvent or operations such as distillation and purification after the respective steps, whereby the purity of each compound may be increased.

The surfactant (a) may also be produced by a production method including:

a step (31a) of reacting an alkyl halide represented by the formula:

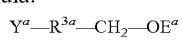

wherein $R^{3a}$ is defined as described above, $Y^a$ is a halogen atom, and $E^a$ is a leaving group, and lithium acetylide represented by the formula:

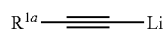

wherein $R^{1a}$ is defined as described above, to provide a compound (31a) represented by the formula:

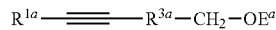

wherein $R^{1a}$, $R^{3a}$, and $E^a$ are defined as described above;

a step (32a) of oxidizing the compound (31a) to provide a compound (32a) represented by the formula:

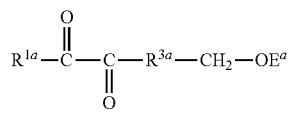

wherein $R^{1a}$, $R^{3a}$, and $E^a$ are defined as described above;

a step (33a) of eliminating the leaving group in the compound (32a) to provide a compound (33a) represented by the formula:

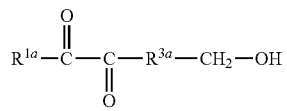

wherein $R^{1a}$ and $R^{3a}$ are defined as described above; and a step (34a) of oxidizing the compound (33a) to provide a compound (34a) represented by the formula:

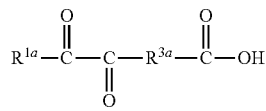

wherein $R^{1a}$ and $R^{3a}$ are defined as described above.

Regarding the reaction ratio between the alkyl halide and the lithium acetylide in the step (31a), the lithium acetylide may be used in an amount of 1 to 2 mol with respect to 1 mol of the alkyl halide, so as to improve the yield and to reduce the waste.

The reaction in the step (31a) may be performed in a solvent. Examples of the solvent include hexane.

The oxidation in the step (32a) may be pertained in a nitrile solvent using a complex generated by treating [(Cn*)Ru$^{III}$(CF$_3$CO$_2$)$_3$].H$_2$O (wherein Cn* is 1,4,7-trimethyl-1,4,7-triazabicyclononane) with (NH$_4$)$_2$Ce(NO$_3$)$_6$ and trifluoroacetic acid and then adding sodium perchlorate thereto.

After the oxidation is completed, the product may be neutralized with an alkali, and then an organic solvent such as an ether may be used to extract the compound (32a).

The elimination reaction for the leaving group in the step (33a) may be performed using a fluoride ion or an acid.

Examples of methods of eliminating the leaving group include a method using hydrofluoric acid; a method using an amine complex of hydrogen fluoride such as pyridine-nHF or triethylamine-nHF; a method using an inorganic salt such as cesium fluoride, potassium fluoride, lithium tetrafluoroborate (LiBF$_4$), or ammonium fluoride; and a method using an organic salt such as tetrabutylammonium fluoride (TBAF).

The elimination reaction for the leaving group in the step (33a) may be performed in a solvent. The solvent to be used may be an organic solvent, including aprotic polar solvents, and specific examples thereof include ethers.

The oxidation in the step (34a) may be performed in a solvent in the presence of sodium chlorite.

The solvent to be used may be alcohol or water, for example. A disodium hydrogen phosphate solution may be used as the buffer, for example.

The compound (34a) may be contacted with an alkali to convert —COOH to a salt faun. Examples of the alkali include sodium hydroxide, potassium hydroxide, lithium hydroxide, and ammonia, and specifically, an aqueous solution of ammonia may be used, for example.

The resulting compounds may be subjected to any of evaporation of a solvent or operations such as distillation and purification after the respective steps, whereby the purity of each compound may be increased.

The surfactant (a) may be produced by a production method including:

a step (51a) of reacting a divinyl ketone represented by the formula:

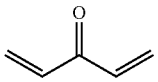

and 2methylfuran represented by the formula:

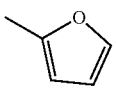

to provide a compound (51a) represented by the formula:

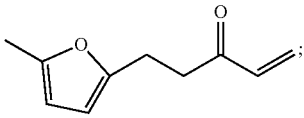

a step (52a) of reacting the compound (51a) and a furan represented by the formula:

to provide a compound (52a) represented by the formula:

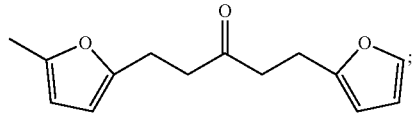 [SMILES: Cc1ccc(CCC(=O)CCc2ccco2)o1]

a step (53a) of heating the compound (52a) in the presence of an acid to provide a compound (53a) represented by the formula:

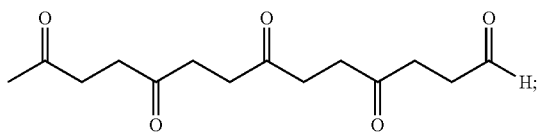

and
a step (54a) of oxidizing the compound (53a) to provide a compound (54a) represented by the formula:

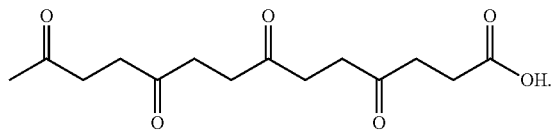 [SMILES: CC(=O)CCC(=O)CCC(=O)CCC(=O)CCC(=O)O]

Regarding the reaction ratio between divinyl ketone and 2-methylfuran in the step (51a), 2-methylfuran may be used in an amount of 0.5 to 1 mol with respect to 1 mol of divinyl ketone, so as to improve the yield and to reduce the waste.

The reaction in the step (51a) may be performed in the presence of an acid. Examples of the acid include acetic acid, hydrochloric acid, and p-toluenesulfonic acid.

Regarding the amount of the acid used in the step (51a), the acid may be used in an amount of 0.1 to 2 mol with respect to 1 mol of divinyl ketone, so as to improve the yield and to reduce the waste.

The reaction in the step (51a) may be performed in a polar solvent. Examples of the solvent include water and acetonitrile.

Regarding the reaction ratio between the compound (51a) and the furan in the step (52a), the furan may be used in an amount of 1 to 2 mol with respect to 1 mol of the compound (51a), so as to improve the yield and to reduce the waste.

The reaction in the step (52a) may be performed in the presence of an acid, and examples of the acid include acetic acid, hydrochloric acid, and p-toluenesulfone.

Regarding the amount of the acid used in the step (52a), the acid may be used in an amount of 0.1 to 2 mol with respect to 1 mol of the compound (51a), so as to improve the yield and to reduce the waste.

The reaction in the step (52a) may be performed in a polar solvent. Examples of the solvent include water.

In the step (53a), the furan ring is cleaved by heating the compound (52a) in the presence of an acid.

The acid to be used may be hydrochloric acid and sulfuric acid, for example.

The reaction in the step (53a) may be performed in a polar solvent. Examples of the solvent include water.

The oxidation in the step (54a) may be pertained in a solvent in the presence of sodium chlorite.

The solvent to be used may be tert-butyl alcohol or water, for example. A disodium hydrogen phosphate solution may be used as the buffer, for example.

The compound (54a) may be contacted with an alkali to convert —COOH to a salt form. Examples of the alkali include sodium hydroxide, potassium hydroxide, lithium hydroxide, and ammonia, and specifically, an aqueous solution of ammonia may be used, for example.

The resulting compounds may be subjected to any of evaporation of a solvent or operations such as distillation and purification after the respective steps, whereby the purity of each compound may be increased.

The surfactant (a) may also be produced by a production method including:

a step (61a) of reacting an alkene represented by the formula:

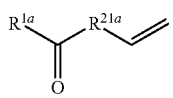

wherein $R^{1a}$ is defined as described above, and R?Ia is a single bond or a divalent linking group, and an alkyne represented by the formula:

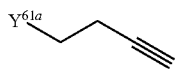

wherein $Y^{61a}$ is an alkyl ester group,
to provide a compound (61a) represented by the formula:

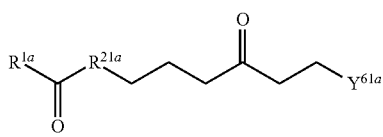

wherein $R^{1a}$, $R^{21a}$, and $Y^{61a}$ are defined as described above; and a step (62a) of allowing an alkali to act on the compound (61a) and then allowing an acid to act on the compound (61a) to provide a compound (62a) represented by the formula:

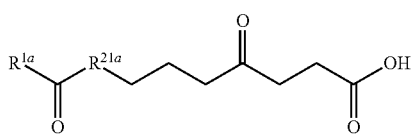

wherein $R^{1a}$ and $R^{21a}$ are defined as described above.

Regarding the reaction ratio between the alkene and the alkyne in the step (61a), the alkene may be used in an amount of 0.5 to 2 mol with respect to 1 mol of the alkyne, so as to improve the yield and to reduce the waste.

The reaction in the step (61a) may be pertained in the presence of a metal catalyst. Examples of the metal include ruthenium.

Regarding the amount of the metal catalyst used in the step (61a), the metal catalyst may be used in an amount of 0.01 to 0.4 mol with respect to 1 mol of the alkene, so as to improve the yield and to reduce the waste.

The reaction in the step (61a) may be performed in a polar solvent. Examples of the solvent include water, acetonitrile, dimethylacetamide, and dimethylformamide.

Regarding the reaction ratio between the compound (61a) and the alkali in the step (62a), the alkali may be used in an amount of 0.6 to 2 mol with respect to 1 mol of the compound (61a), so as to improve the yield and to reduce the waste.

Regarding the amount of the acid used in the step (62a), the acid may be used in an amount of 1.0 to 20.0 mol with respect to 1 mol of the compound (61a), so as to improve the yield and to reduce the waste.

The reaction in the step (62a) may be performed in a polar solvent. Examples of the solvent include water.

The compound (62a) may be contacted with an alkali to convert —COOH to a salt faun. Examples of the alkali include sodium hydroxide, potassium hydroxide, lithium hydroxide, and ammonia, and an aqueous solution of ammonia may be used, for example.

The resulting compounds may be subjected to any of evaporation of a solvent or operations such as distillation and purification after the respective steps, whereby the purity of each compound may be increased.

The surfactant (b) is a novel compound and may be produced, for example, by the following production method.

The surfactant (b) may be produced by a production method including:

a step (11b) of reacting a compound (10b) represented by the following formula:

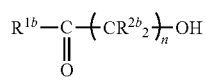

wherein $R^{1b}$, $R^{2b}$, and n are defined as described above, and a sultone represented by the following formula:

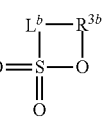

wherein $R^{3b}$ is defined as described above; $L^b$ is a single bond, —CO$_2$—B—*, —OCO—B—*, —CONR$^{6b}$—B—*, —NR$^{6b}$CO—B—*, or —CO— other than the carbonyl groups in-CO$_2$—B—, —OCO—B—, —CONR$^{6b}$—B—, —NR$^{6b}$CO—B—, where B is a single bond or an alkylene group having 1 to 10 carbon atoms and optionally having a substituent, $R^{6b}$ is H or an alkyl group having 1 to 4 carbon atoms and optionally having a substituent; and * indicates the bond to —S(=O)$_2$— in the formula, to provide a compound (11b) represented by the following formula:

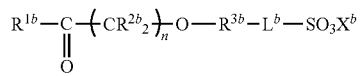

wherein $R^{1b}$ to $R^{3b}$, n, and $X^b$ are defined as described above; $L^b$ is a single bond, —CO$_2$—B—*, —OCO—B—*, —CONR$^{6b}$—B—*, —NR$^{6b}$CO—B—*, or —CO— other than the carbonyl groups in-CO$_2$—B—, —OCO—B—, —CONR$^{6b}$—B—, —NR$^{6b}$CO—B—, where B is a single bond or an alkylene group having 1 to 10 carbon atoms and optionally having a substituent, $R^{6b}$ is H or an alkyl group having 1 to 4 carbon atoms and optionally having a substituent; and * indicates the bond to —SO$_x$X$^b$ in the formula.

The reaction in the step (11b) may be performed in the presence of a base.

Examples of the base include sodium hydride, sodium hydroxide, potassium hydroxide, and triethylamine. The base may be used in an amount of 0.5 to 20 mol with respect to 1 mol of compound (10b).

The reaction in the step (11b) may be performed in a solvent.

The solvent to be used may be an organic solvent, including an aprotic polar solvent, and specific example thereof include ethers, aromatic compounds, nitriles, and halogenated hydrocarbons.

The surfactant (b) may also be produced by a production method including:

a step (21b) of oxidizing a compound (20b) represented by the following formula:

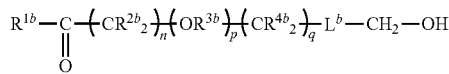

wherein R$^{1b}$ to R$^{4b}$, n, p, and q are defined as described above; L$^b$ is a single bond, —CO$_2$—B—*, —OCO—B—*, —CONR$^{6b}$—B—*, —NR$^{6b}$CO—B—*, or —CO— other than the carbonyl groups in -CO$_2$—B—, —OCO—B—, —CONR$^{6b}$—B—, —NR$^{6b}$CO—B—, where B is a single bond or an alkylene group having 1 to 10 carbon atoms and optionally having a substituent, R$^{6b}$ is H or an alkyl group having 1 to 4 carbon atoms and optionally having a substituent; and * indicates the bond to —CH$_2$—OH in the formula, to provide a compound (21b) represented by the following formula:

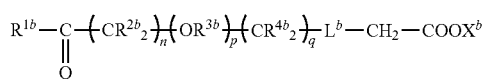

wherein R$^{1b}$ to R$^{4b}$, n, p, q, and X$^b$ are defined as described above; L$^b$ is a single bond, —CO$_2$—B—*, —OCO—B—*, —CONR$^{6b}$—B—*, —NR$^{6b}$CO—B—*, or —CO— other than the carbonyl groups in -CO$_2$—B—, —OCO—B—, —CONR$^{6b}$—B—, —NR$^{6b}$CO—B—, where B is a single bond or an alkylene group having 1 to 10 carbon atoms and optionally having a substituent, R$^{6b}$ is H or an alkyl group having 1 to 4 carbon atoms and optionally having a substituent; and * indicates the bond to —COOX$^b$ in the formula.

The oxidation in the step (21b) may be pertained by allowing a nitrosating agent to act on the compound (20b).

The nitrosating agent to be used may be sodium nitrite, nitrosylsulfuric acid, isoamyl nitrite and the like, for example.

The nitrosating agent may be used in an amount of 0.5 to 10 mol with respect to 1 mol of the compound (20b).

The oxidation in the step (21b) may be performed in a solvent. The solvent to be used may be trifluoroacetic acid and acetonitrile, for example.

The compound (10b) and the compound (20b) may be produced by a production method including:

a step (101b) of hydroxylating a compound (100b) represented by the following formula:

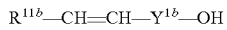

wherein R$^{11b}$ is H, a linear or branched alkyl group having 1 or more carbon atoms and optionally having a substituent or a cyclic alkyl group having 3 or more carbon atoms and optionally having a substituent, and optionally contains a monovalent or divalent heterocyclic ring or optionally forms a ring when containing 3 or more carbon atoms; and Y$^{1b}$ is —(CR$^{2b}$$_n$)$_n$— or —(CR$^{2b}$$_2$)$_n$—(OR$^{3b}$)$_p$—(CR$^{4b}$$_2$)$_q$—L$^b$—CH$_2$—, wherein R$^{2b}$ to R$^{4b}$, n, p, and q are defined as described above; and L$^b$ n is a single bond, —CO$_2$—B—*, —OCO—B—*, —CONR$^{6b}$—B—*, —NR$^{6b}$CO—B—*, or —CO— other than the carbonyl groups in -CO$_2$—B—, —OCO—B—, —CONR$^{6b}$—B—, —NR$^{6b}$CO—B—, where B is a single bond or an alkylene group having 1 to 10 carbon atoms and optionally having a substituent, R$^{6b}$ is H or an alkyl group having 1 to 4 carbon atoms and optionally having a substituent; and * indicates the bond to —CH$_2$— in the formula, to provide a compound (101b) represented by the following formula:

$$R^{11b}-CH_2-\underset{\underset{OH}{|}}{CH}-Y^{1b}-OH$$

wherein R$^{11b}$ and Y$^{1b}$ are defined as described above; and a step (102b) of oxidizing the compound (101b) to provide a compound (102b) represented by the following formula:

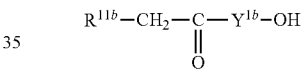

wherein R$^{11b}$ and Y$^{1b}$ are defined as described above.

The alkyl group for R$^{11b}$ is preferably free of a carbonyl group.

In the alkyl group for R$^{11b}$, 75% or less of the hydrogen atoms bonded to any of the carbon atoms may be replaced with halogen atoms, 50% or less thereof may be replaced with halogen atoms, or 25% or less thereof may be replaced with halogen atoms. The alkyl group is preferably a non-halogenated alkyl group containing no halogen atoms such as fluorine atoms and chlorine atoms.

The alkyl group preferably does not have any substituents.

R$^{11b}$ is preferably H, a linear or branched alkyl group having 1 to 9 carbon atoms and optionally having a substituent or a cyclic alkyl group having 3 to 9 carbon atoms and optionally having a substituent, more preferably H, a linear or branched alkyl group having 1 to 9 carbon atoms free of a carbonyl group, or a cyclic alkyl group having 3 to 9 carbon atoms free of a carbonyl group, still more preferably H, or a linear or branched alkyl group having 1 to 9 carbon atoms having no substituent, still further preferably H, a methyl group (—CH$_3$), or an ethyl group (—C$_2$H$_5$), particularly preferably H or a methyl group (—CH$_3$), and most preferably H.

The hydroxylation in the step (101b) may be performed by a method (1b) in which iron(II) phthalocyanine (Fe(Pc)) and sodium borohydride are allowed to act on the compound (100b) in an oxygen atmosphere or a method (2b) in which isopinocampheylborane (IpcBH2) is allowed to act on the compound (100b) and then the resulting intermediate (dialkyl borane) is oxidized.

In the method (1b), the iron(II) phthalocyanine may be used in a catalytic amount, and may be used in an amount of 0.001 to 1.2 mol with respect to 1 mol of the compound (100b).

In the method (1b), sodium borohydride may be used in an amount of 0.5 to 20 mol with respect to 1 mol of the compound (100b).

The reaction in the method (1b) may be pertained in a solvent. The solvent to be used may be an organic solvent, and specific examples thereof include ethers, halogenated hydrocarbons, aromatic hydrocarbons, nitriles, and nitrogen-containing polar organic compounds.

In the method (2b), isopinocampheylborane may be used in an amount of 1.0 to 10.0 mol with respect to 1 mol of the compound (100b).

The reaction of the compound (100b) with isopinocampheylborane may be performed in a solvent. The solvent to be used may be an organic solvent, and specific examples thereof include ethers, halogenated hydrocarbons, and aromatic hydrocarbons.

The reaction temperature of the compound (100b) with isopinocampheylborane may be −78 to 200° C.

The reaction pressure of the compound (100b) with isopinocampheylborane may be 0 to 5.0 MPa.

The reaction time of the compound (100b) with isopinocampheylborane may be 0.1 to 72 hours.

The oxidation in the method (2b) may be pertained by allowing an oxidizing agent to act on the above intermediate. Examples of the oxidizing agent include hydrogen peroxide. The oxidizing agent may be used in an amount of 0.7 to 10 mol with respect to 1 mol of the intermediate.

The oxidation in the method (2b) may be pertained in a solvent. Examples of the solvent include water, methanol, and ethanol.

The oxidation of the compound (101b) in the step (102b) may be performed by, for example, (a) a method using the Jones reagent ($CrO_3/H_2SO_4$) (Jones oxidation), (b) a method using Dess-Martin periodinane (DMP) (Dess-Martin oxidation), (c) a method using pyridinium chlorochromate (PCC), (d) a method of allowing a bleaching agent (about 5% to 6% aqueous solution of NaOCl) to act in the presence of a nickel compound such as $NiCl_2$, or (e) a method of allowing a hydrogen acceptor such as an aldehyde or a ketone to act in the presence of an aluminum catalyst such as $Al(CH_3)_3$ or $Al[OCH(CH_3)_2]$ (Oppenauer oxidation).

The oxidation in the step (102b) may be performed in a solvent. The solvent to be used may be water and an organic solvent, and specific examples thereof include water, ketones, ethers, halogenated hydrocarbons, aromatic hydrocarbons, and nitriles.

The compound (10b) and the compound (20b) may also be produced by a production method including:

a step (201b) of ozonolyzing a compound (200b) represented by the following formula:

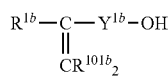

wherein $R^{1b}$ and $Y^{1b}$ are defined as described above; and $R^{101b}$ is an organic group, to provide a compound (201b) represented by the following formula:

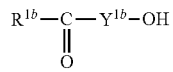

wherein $R^{1b}$ and $Y^{1b}$ are defined as described above.

$R^{101b}$s are each preferably an alkyl group having 1 to 20 carbon atoms. The two $R^{101b}$s may be the same as or different from each other.

The ozonolysis in the step (201b) may be performed by allowing ozone to act on the compound (200b), followed by post-treatment with a reducing agent.

The ozone may be generated by dielectric barrier discharge in oxygen gas.

Examples of the reducing agent used in the post-treatment include zinc, dimethyl sulfide, thiourea, and phosphines.

The ozonolysis in the step (201b) may be performed in a solvent. The solvent to be used may be water and an organic solvent, and examples thereof include water, alcohols, carboxylic acids, ethers, halogenated hydrocarbons, and aromatic hydrocarbons.

The compound (10b) and the compound (20b) may also be produced by a production method including:

a step (301b) of epoxidizing a compound (300b) represented by the following formula:

$$R^{21b}—CH=CH—Y^{1b}—OH$$

wherein $Y^{1b}$ is defined as described above; and $R^{21b}$ is H, a linear or branched alkyl group having 1 or more carbon atoms and optionally having a substituent or a cyclic alkyl group having 3 or more carbon atoms and optionally having a substituent, and optionally contains a monovalent or divalent heterocyclic ring or optionally forms a ring when containing 3 or more carbon atoms, to provide a compound (301b) represented by the following formula:

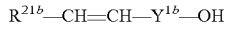

wherein $R^{21b}$ and $Y^{1b}$ are defined as described above;

a step (302b) of reacting the compound (301b) with a dialkylcopper lithium represented by $R^{22b}{}_2CuLi$ wherein $R^{22b}$ is a linear or branched alkyl group having 1 or more carbon atoms and optionally having a substituent or a cyclic alkyl group having 3 or more carbon atoms and optionally having a substituent, and optionally contains a monovalent or divalent heterocyclic ring or optionally fauns a ring when containing 3 or more carbon atoms, to provide a compound (302b) represented by the following formula:

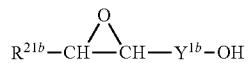

wherein $R^{21b}$, $R^{22b}$, and $Y^{1b}$ are defined as described above; and a step (303b) of oxidizing the compound (302b) to provide a compound (303b) represented by the following formula:

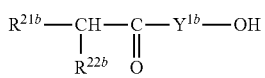

wherein $R^{21b}$, $R^{22b}$, and $Y^{1b}$ are defined as described above.

The alkyl group for $R^{21b}$ is preferably free of a carbonyl group.

In the alkyl group for $R^{21b}$, 75% or less of the hydrogen atoms bonded to any of the carbon atoms may be replaced with halogen atoms, 50% or less thereof may be replaced with halogen atoms, or 25% or less thereof may be replaced with halogen atoms. The alkyl group is preferably a non-halogenated alkyl group containing no halogen atoms such as fluorine atoms and chlorine atoms.

The alkyl group preferably does not have any substituents.

$R^{21b}$ is preferably H, a linear or branched alkyl group having 1 to 8 carbon atoms and optionally having a substituent or a cyclic alkyl group having 3 to 8 carbon atoms and optionally having a substituent, more preferably H, a linear or branched alkyl group having 1 to 8 carbon atoms free of a carbonyl group, or a cyclic alkyl group having 3 to 8 carbon atoms free of a carbonyl group, still more preferably H, or a linear or branched alkyl group having 1 to 8 carbon atoms having no substituent, particularly preferably H or a methyl group (—CH₃), and most preferably H.

The alkyl group for $R^{22b}$ is preferably free of a carbonyl group.

In the alkyl group for $R^{22b}$, 75% or less of the hydrogen atoms bonded to any of the carbon atoms may be replaced with halogen atoms, 50% or less thereof may be replaced with halogen atoms, or 25% or less thereof may be replaced with halogen atoms. The alkyl group is preferably a non-halogenated alkyl group containing no halogen atoms such as fluorine atoms and chlorine atoms.

The alkyl group preferably does not have any substituents.

$R^{22b}$ is preferably a linear or branched alkyl group having 1 to 9 carbon atoms and optionally having a substituent or a cyclic alkyl group having 3 to 9 carbon atoms and optionally having a substituent, more preferably a linear or branched alkyl group having 1 to 9 carbon atoms free of a carbonyl group or a cyclic alkyl group having 3 to 9 carbon atoms free of a carbonyl group, still more preferably a linear or branched alkyl group having 1 to 9 carbon atoms having no substituent, particularly preferably a methyl group (—CH₃) or an ethyl group (—C₂H₅), and most preferably a methyl group (—CH₃).

The two $R^{22b}$s may be the same as or different from each other.

$R^{21b}$ and $R^{22b}$ preferably have 1 to 7 carbon atoms in total, and more preferably 1 to 2 carbon atoms.

The epoxidation in the step (301b) may be pertained by allowing an epoxidizing agent to act on the compound (300b).

Examples of the epoxidizing agent include peroxy acids such as meta-chloroperbenzoic acid (m-CPBA), perbenzoic acid, hydrogen peroxide, and tert-butyl hydroperoxide, dimethyl dioxolane, and methyl trifluoromethyl dioxolane.

The epoxidizing agent may be used in an amount of 0.5 to 10.0 mol with respect to 1 mol of the compound (300b).

The epoxidation in the step (301b) may be pertained in a solvent. The solvent to be used may be an organic solvent, and examples thereof include ketones, ethers, halogenated hydrocarbons, aromatic hydrocarbons, nitriles, pyridine, nitrogen-containing polar organic compounds, and dimethyl sulfoxide.

In the step (302b), the dialkylcopper lithium may be used in an amount of 0.5 to 10.0 mol with respect to 1 mol of the compound (301b).

The reaction of the step (302b) may be pertained in a solvent. The solvent to be used may be an organic solvent, and examples thereof include ethers, halogenated hydrocarbons, and aromatic hydrocarbons.

The oxidation of the compound (302b) in the step (303b) may be performed by, for example, (a) a method using the Jones reagent (CrO₃/H₂SO₄) (Jones oxidation), (b) a method using Dess-Martin periodinane (DMP) (Dess-Martin oxidation), (c) a method using pyridinium chlorochromate (PCC), (d) a method of allowing a bleaching agent (about 5% to 6% aqueous solution of NaOCl) to act in the presence of a nickel compound such as NiCl₂, or (e) a method of allowing a hydrogen acceptor such as an aldehyde or a ketone to act in the presence of an aluminum catalyst such as Al(CH₃)₃ or Al[OCH(CH₃)₂]₃ (Oppenauer oxidation).

The oxidation in the step (303b) may be performed in a solvent. The solvent to be used may be water and an organic solvent, and examples thereof include water, ketones, alcohols, ethers, halogenated hydrocarbons, aromatic hydrocarbons, and nitriles.

The compound (10b) and the compound (20b) may also be produced by a production method including:

a step (401b) of oxidizing a compound (100b) represented by the following formula:

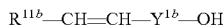

wherein $R^{11b}$ and $Y^{1b}$ are defined as described above, to provide a compound (401b) represented by the following formula:

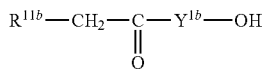

wherein $R^{11b}$ and $Y^{1b}$ are defined as described above.

The oxidation in the step (401b) may be performed by allowing an oxidizing agent to act on the compound (100b) in the presence of water and a palladium compound.

Examples of the oxidizing agent include monovalent or divalent copper salts such as copper chloride, copper acetate, copper cyanide, and copper trifluoromethanethiolate, iron salts such as iron chloride, iron acetate, iron cyanide, iron trifluoromethanethiolate, and hexacyanoferrates, benzoquinones such as 1,4-benzoquinone, 2,3-dichloro-5,6-dicyano-1,4-benzoquinone, tetrachloro-1,2-benzoquinone, and tetrachloro-1,4-benzoquinone, H₂O₂, MnO₂, KMnO₄, RuO₄, m-chloroperbenzoic acid, and oxygen.

The oxidizing agent may be used in an amount of 0.001 to 10 mol with respect to 1 mol of compound (100b).

The water may be used in an amount of 0.5 to 1000 mol with respect to 1 mol of the compound (100b).

Examples of the palladium compound include palladium dichloride. The palladium compound may be used in a catalytic amount, and may be used in an amount of 0.0001 to 1.0 mol with respect to 1 mol of the compound (100b).

The oxidation in the step (401b) may be performed in a solvent. Examples of the solvent include water, esters, aliphatic hydrocarbons, aromatic hydrocarbons, alcohols, carboxylic acids, ethers, halogenated hydrocarbons, nitrogen-containing polar organic compounds, nitriles, dimethyl sulfoxide, and sulfolane.

The surfactant (b) may also be produced by a production method including:

a step (31b) of oxidizing a compound (30b) represented by the following formula:

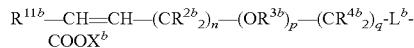

wherein $R^{2b}$ to $R^{4b}$, $R^{11b}$, n, p, q, and $X^b$ are defined as described above; $L^b$ is a single bond, —$CO_2$—B—*, —OCO—B—*, —$CONR^{6b}$—B—*, —$NR^{6b}CO$—B—*, or —CO— other than the carbonyl groups in-$CO_2$—B—, —OCO—B—, —$CONR^{6b}$—B—, —$NR^{6b}CO$—B—, where B is a single bond or an alkylene group having 1 to 10 carbon atoms and optionally having a substituent, $R^{6b}$ is H or an alkyl group having 1 to 4 carbon atoms and optionally having a substituent; and * indicates the bond to —$COOX^b$ in the formula, to provide a compound (31b) represented by the following formula:

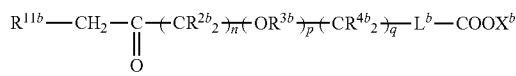

wherein $R^{2b}$ to $R^{4b}$, $R^{11b}$, n, p, q, and $X^b$ are defined as described above; $L^b$ is a single bond, —$CO_2$—B—*, —OCO—B—*, —$CONR^{6b}$—B—*, —$NR^{6b}CO$—B—*, or —CO— other than the carbonyl groups in-$CO_2$—B—, —OCO—B—, —$CONR^{6b}$—B—, —$NR^{6b}CO$—B—, where B is a single bond or an alkylene group having 1 to 10 carbon atoms and optionally having a substituent, $R^{6b}$ is H or an alkyl group having 1 to 4 carbon atoms and optionally having a substituent; and * indicates the side bound to —$COOX^b$ in the formula.

The oxidation in the step (31b) may be performed by allowing an oxidizing agent to act on the compound (30b) in the presence of water and a palladium compound under the same conditions as in the oxidation in the step (401b).

In any of the production methods described above, the resulting compounds may be subjected to any of evaporation of a solvent or operations such as distillation and purification after the respective steps, whereby the purity of each compound may be increased. When the resulting compound is a compound in which $X^b$ is H, such as —$OSO_3H$, —COOH, or the like, the compound may be brought into contact with an alkali such as sodium carbonate or ammonia so that these groups may be converted into a salt form.

The surfactant (a) or (b) may also be used to produce a high molecular weight PTFE. In other words, even without a conventional fluorine-containing surfactant, the production method of the present invention using the surfactant can surprisingly produce a PTFE having a molecular weight equivalent to that of a PTFE obtained by a production method using such a conventional fluorine-containing surfactant.

The surfactant (a) or (b) may also be used to produce a low molecular weight PTFE.

The low molecular weight PTFE may be produced by polymerization, or may be produced by a known method (e.g., thermolysis, radiolysis) of reducing the molecular weight of a high molecular weight PTFE obtained by polymerization.

Examples of the hydrocarbon surfactant include at least one selected from the group consisting of:

a surfactant (a1) represented by the following formula (a1):

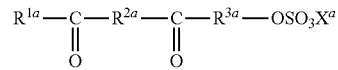

wherein $R^{1a}$ is a linear or branched alkyl group having 1 or more carbon atoms or a cyclic alkyl group having 3 or more carbon atoms, a hydrogen atom bonded to a carbon atom is optionally replaced with a hydroxy group or a monovalent organic group containing an ester bond, and $R^{1a}$ optionally contains a carbonyl group when containing 2 or more carbon atoms, and optionally contains a monovalent or divalent heterocyclic ring or optionally forms a ring when containing 3 or more carbon atoms; $R^{2a}$ and $R^{3a}$ are each independently a single bond or a divalent linking group; $R^{1a}$, $R^{2a}$, and $R^{3a}$ have 6 or more carbon atoms in total; $X^a$ is H, a metal atom, $NR^{4a}_4$, imidazolium optionally having a substituent, pyridinium optionally having a substituent, or phosphonium optionally having a substituent, where $R^{4a}$s are each H or an organic group and are the same as or different from each other; and any two of $R^{1a}$, $R^{2a}$, and $R^{3a}$ are optionally bonded to each other to form a ring; and a surfactant (b1) represented by the following formula (b1):

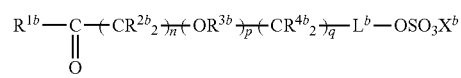

wherein $R^{1b}$ is a linear or branched alkyl group having 1 or more carbon atoms and optionally having a substituent or a cyclic alkyl group having 3 or more carbon atoms and optionally having a substituent, and optionally contains a monovalent or divalent heterocyclic ring or optionally foams a ring when containing 3 or more carbon atoms; $R^{2b}$ and $R^{4b}$ are each independently H or a substituent; $R^{3b}$ is an alkylene group having 1 to 10 carbon atoms and optionally having a substituent; n is an integer of 1 or more; p and q are each independently an integer of 0 or more; $X^b$ is H, a metal atom, $NR^{5b}_4$, imidazolium optionally having a substituent, pyridinium optionally having a substituent, or phosphonium optionally having a substituent, where $R^{5b}$s are each H or an organic group and are the same as or different from each other; any two of $R^{1b}$, $R^{2b}$, $R^{3b}$, and $R^{4b}$ are optionally bonded to each other to form a ring; $L_b$ is a single bond, —$CO_2$—B—*, —OCO—B—*, —$CONR^{6b}$—B—*, —$NR^{6b}CO$—B—*, or —CO— other than the carbonyl groups in-$CO_2$—B—, —OCO—B—, —$CONR^{6b}$—B—, —$NR^{6b}CO$—B—, where B is a single bond or an alkylene group having 1 to 10 carbon atoms and optionally having a substituent, $R^{6b}$ is H or an alkyl group having 1 to 4 carbon atoms and optionally having a substituent; and * indicates the bond to —$OSO_3X^b$ in the formula.

The surfactant (a1) will be described.

$R^{1a}$, $R^{2a}$, and $R^{3a}$ in the formula (a1) are preferably those listed as $R^{1a}$, $R^{2a}$, and $R^{3a}$ in the formula (a).

$R^{1a}$, $R^{2a}$, and $R^{3a}$ have 6 or more carbon atoms in total. The total number of carbon atoms is preferably 8 or more, more preferably 9 or more, and still more preferably 10 or more, and preferably 20 or less, more preferably 18 or less, and still more preferably 15 or less.

Any two of $R^{1a}$, $R^{2a}$, and $R^{3a}$ are optionally bonded to each other to foam a ring.

$X^a$ in the formula (a1) is preferably any of those listed as $X^a$ in the formula (a).

Next, the surfactant (b1) will be described.

$R^{1b}$, $R^{2b}$, $R^{3b}$, and $R^{4b}$ in the formula (b1) are preferably those listed as $R^{1b}$, $R^{2b}$, $R^{3b}$, and $R^{4b}$ in the formula (b).

In the formula (b1), any two of $R^{1b}$, $R^{2b}$, $R^{3b}$, and $R^{4b}$ are optionally bonded to each other to foam a ring, but they preferably do not foam a ring.

In the formula (b21), n is an integer of 1 or more. n is preferably an integer of 1 to 40, more preferably an integer of 1 to 30, still more preferably an integer of 5 to 25, particularly preferably an integer of 5 to 9, and 11 to 25.

In the formula (b1), p and q are each independently an integer of 0 or more. p is preferably an integer of 0 to 10, and more preferably 0 or 1. q is preferably an integer of 0 to 10, and more preferably an integer of 0 to 5.

The total of n, p, and q is preferably an integer of 5 or more. The total of n, p, and q is more preferably an integer of 8 or more. The total of n, p, and q is also preferably an integer of 60 or less, more preferably an integer of 50 or less, and still more preferably an integer of 40 or less.

$X^b$ in the formula (b1) is preferably any of those listed as $X^b$ in the formula (b1).

The surfactant (b) is preferably a compound represented by the following formula:

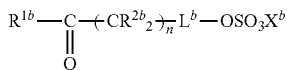

wherein $L^b$, $R^{1b}$, $R^{2b}$, n, and $X^b$ are defined as described above.

The surfactant preferably has a $^1$H-NMR spectrum in which all peak intensities observed in a chemical shift range of 2.0 to 5.0 ppm to give an integral of 10% or more.

The surfactant preferably has a $^1$H-NMR spectrum in which all peak intensities observed in a chemical shift range of 2.0 to 5.0 ppm give an integral within the above range. In this case, the surfactant preferably has a ketone structure in the molecule.

In the surfactant, the integral is more preferably 15 or more, preferably 95 or less, more preferably 80 or less, and still more preferably 70 or less.

The integral is determined using a heavy water solvent at room temperature. The heavy water content is adjusted to 4.79 ppm.

The surfactant (a1) is a novel compound and may be produced, for example, by the following production method.

The surfactant (a1) may be produced by a production method including:

a step (11a) of reacting a compound (10a) represented by the formula:

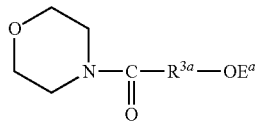

wherein R is defined as described above, and $E^a$ is a leaving group, lithium, and a chlorosilane compound represented by the formula:

wherein $R^{201a}$ are each independently an alkyl group or an aryl group, to provide a compound (11a) represented by the formula:

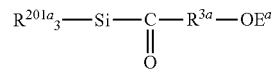

wherein $R^{3a}$, $R^{201a}$, and $E^a$ are defined as described above;

a step (12a) of reacting the compound (11a) and an olefin represented by the formula:

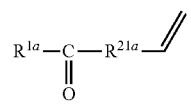

wherein $R^{1a}$ is defined as described above, and $R^{21a}$ is a single bond or a divalent linking group, to provide a compound (12a) represented by the formula:

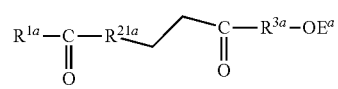

wherein $R^{1a}$, $R^{21a}$, $R^{3a}$, and $E^a$ are defined as described above;

a step (13a) of eliminating the leaving group in the compound (12a) to provide a compound (13a) represented by the formula:

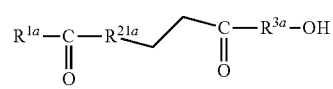

wherein $R^{1a}$, $R^{21a}$, and $R^{3a}$ are defined as described above; and a step (14a) of reacting the compound (13a) and a chlorosulfonic acid represented by the formula:

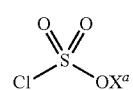

wherein $X^a$ is defined as described above, to provide a compound (14a) represented by the formula:

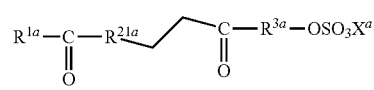

wherein $R^{1a}$, $R^{21a}$, $R^{3a}$, and $X^a$ are defined as described above.

The steps (11a) to (13a) are the same as those in the production method of the above-mentioned surfactant (a).

Regarding the reaction ratio between the compound (13a) and the chlorosulfonic acid in the step (14a), the chlorosulfonic acid may be used in an amount of 1 to 2 mol with respect to 1 mol of the compound (13a), so as to improve the yield and to reduce the waste.

The reaction in the step (14a) may be performed in the presence of a base. Examples of the base include alkali metal hydroxides, alkaline earth metal hydroxides, and amines.

Examples of the amines in the step (14a) include tertiary amines such as trimethylamine, triethylamine, tributylamine, N,N-dimethylaniline, dimethylbenzylamine, and N,N,N',N'-tetramethyl-1,8-naphthalenediamine, heteroaromatic amines such as pyridine, pyrrole, uracil, collidine, and lutidine, and cyclic amines such as 1,8-diaza-bicyclo[5.4.0]-7-undecene and 1,5-diaza-bicyclo[4.3.0]-5-nonene.

Regarding the amount of the base used in the step (14a), the base may be used in an amount of 1 to 2 mol with respect to 1 mol of the compound (13a).

The reaction in the step (14a) may be performed in a polar solvent. The solvent to be used may be an organic solvent, including aprotic polar solvents, and specific examples thereof include ethers.

Performing the reaction in the step (14a) in a solvent provides a solution containing the compound (14a) after completion of the reaction. Optionally, the compound (14a) at high purity may be collected therefrom by adding water to the solution, leaving the mixture to stand and thereby separating the mixture into two phases, collecting the aqueous phase, and evaporating the solvent. When the compound (14a) contains a group represented by —OSO$_3$H (i.e., when X is H), an alkaline aqueous solution such as a sodium hydrogen carbonate aqueous solution or ammonia water may be used instead of water to convert the —OSO$_3$H group into a sulfuric acid salt group.

The resulting compounds may be subjected to any of evaporation of a solvent or operations such as distillation and purification after the respective steps, whereby the purity of each compound may be increased.

The surfactant (a1) may also be produced by a production method including:

a step (21a) of reacting a ketone represented by the formula:

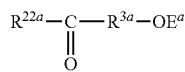

wherein R$^{3a}$ is defined as described above, R$^{22a}$ is a monovalent organic group, and E$^a$ is a leaving group, and a carboxylate represented by the formula:

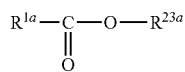

wherein R$^{1a}$ is defined as described above, and R$^{23a}$ is a monovalent organic group, to provide a compound (21a) represented by the formula:

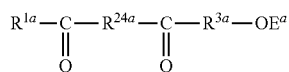

wherein R$^{1a}$, R$^{3a}$, and E$^a$ are defined as described above; and R$^{24a}$ is a single bond or a divalent linking group;

a step (22a) of eliminating the leaving group in the compound (21a) to provide a compound (22a) represented by the formula:

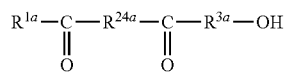

wherein R$^{1a}$, R$^{24a}$, and R$^{3a}$ are defined as described above; and a step (23a) of reacting the compound (22a) and a chlorosulfonic acid represented by the formula:

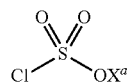

wherein X$^a$ is defined as described above,
to provide a compound (23a) represented by the formula:

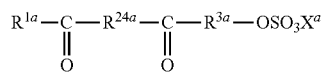

wherein R$^{1a}$, R$^{24a}$, R$^{3a}$, and X$^a$ are defined as described above.

The steps (21a) to (22a) are the same as those in the production method of the above-mentioned surfactant (a).

Regarding the reaction ratio between the compound (22a) and the chlorosulfonic acid in the step (23a), the chlorosulfonic acid may be used in an amount of 1 to 2 mol with respect to 1 mol of the compound (22a), so as to improve the yield and to reduce the waste.

The reaction in the step (23a) may be performed in the presence of a base. Examples of the base include alkali metal hydroxides, alkaline earth metal hydroxides, and amines.

The amines in the step (23a) are the same as those in the step (14a).

Regarding the amount of the base used in the step (23a), the base may be used in an amount of 1 to 2 mol with respect to 1 mol of the compound (22a), so as to improve the yield and to reduce the waste.

The reaction in the step (23a) may be performed in a polar solvent. The solvent to be used may be an organic solvent, including aprotic polar solvents, and specific examples thereof include ethers.

Performing the reaction in the step (23a) in a solvent provides a solution containing the compound (23a) after completion of the reaction. Optionally, the compound (23a) at high purity may be collected therefrom by adding water to the solution, leaving the mixture to stand and thereby separating the mixture into two phases, collecting the aqueous phase, and evaporating the solvent. When the compound (23a) contains a group represented by —OSO$_3$H (i.e., when X is H), an alkaline aqueous solution such as a sodium hydrogen carbonate aqueous solution or ammonia water may be used instead of water to convert the —OSO$_3$H group into a sulfuric acid salt group.

The resulting compounds may be subjected to any of evaporation of a solvent or operations such as distillation and purification after the respective steps, whereby the purity of each compound may be increased.

The surfactant (a1) may also be produced by a production method including:

a step (31a) of reacting an alkyl halide represented by the formula:

$$Y^a-R^{3a}-OE^a$$

wherein $R^{3a}$ is defined as described above, $Y^a$ is a halogen atom, and $E^a$ is a leaving group, and lithium acetylide represented by the formula:

$$R^{1a}-\!\!\!\equiv\!\!\!-Li$$

wherein $R^{1a}$ is defined as described above,
to provide a compound (31a) represented by the formula:

$$R^{1a}-\!\!\!\equiv\!\!\!-R^{3a}-OE^a$$

wherein $R^{1a}$, $R^{3a}$, and $E^a$ are defined as described above;
a step (32a) of oxidizing the compound (31a) to provide a compound (32a) represented by the formula:

$$R^{1a}-\underset{\underset{O}{\|}}{C}-\underset{\underset{O}{\|}}{C}-R^{3a}-OE^a$$

wherein $R^{1a}$, $R^{3a}$, and $E^a$ are defined as described above;
a step (33a) of eliminating the leaving group in the compound (32a) to provide a compound (33a) represented by the formula:

$$R^{1a}-\underset{\underset{O}{\|}}{C}-\underset{\underset{O}{\|}}{C}-R^{3a}-OH$$

wherein $R^{1a}$ and $R^{3a}$ are defined as described above; and
a step (34a) of reacting the compound (33a) and a chlorosulfonic acid represented by the formula:

$$Cl-\underset{\underset{O}{\|}}{\overset{\overset{O}{\|}}{S}}-OX^a$$

wherein $X^a$ is defined as described above,
to provide a compound (34a) represented by the formula:

$$R^{1a}-\underset{\underset{O}{\|}}{C}-\underset{\underset{O}{\|}}{C}-R^{3a}-OSO_3X^a$$

wherein $R^{1a}$, $R^{3a}$, and $X^a$ are defined as described above.

The steps (31a) to (33a) are the same as those in the production method of the above-mentioned surfactant (a).

Regarding the reaction ratio between the compound (33a) and the chlorosulfonic acid in the step (34a), the chlorosulfonic acid may be used in an amount of 1 to 2 mol with respect to 1 mol of the compound (33a), so as to improve the yield and to reduce the waste.

The reaction in the step (34a) may be performed in the presence of a base. Examples of the base include alkali metal hydroxides, alkaline earth metal hydroxides, and amines.

The amines in the step (34a) are the same as those in the step (14a).

Regarding the amount of the base used in the step (34a), the base may be used in an amount of 1 to 2 mol with respect to 1 mol of the compound (33a), so as to improve the yield and to reduce the waste.

The reaction in the step (34a) may be performed in a polar solvent. The solvent to be used may be an organic solvent, including aprotic polar solvents, and specific examples thereof include ethers.

Performing the reaction in the step (34a) in a solvent provides a solution containing the compound (34a) after completion of the reaction. Optionally, the compound (34a) at high purity may be collected therefrom by adding water to the solution, leaving the mixture to stand and thereby separating the mixture into two phases, collecting the aqueous phase, and evaporating the solvent. When the compound (34a) contains a group represented by —OSO$_3$H (i.e., when X is H), an alkaline aqueous solution such as a sodium hydrogen carbonate aqueous solution or ammonia water may be used instead of water to convert the —OSO$_3$H group into a sulfuric acid salt group.

The resulting compounds may be subjected to any of evaporation of a solvent or operations such as distillation and purification after the respective steps, whereby the purity of each compound may be increased.

The surfactant (a1) may also be produced by a production method including:

a step (41a) of reacting an alkene represented by the formula:

wherein $R^{1a}$ is defined as described above, and $R^{21a}$ is a single bond or a divalent linking group, and an alkyne represented by the formula:

$$Y^{51a}-\!\!\!\diagup\!\!\!\diagup\!\!\!\equiv$$

wherein $Y^{51a}$ is an alkoxyl group,
to provide a compound (41a) represented by the formula:

wherein $R^{1a}$ and $R^{21a}$ are defined as described above; and
a step (42a) of reacting the compound (41a) and a chlorosulfonic acid represented by the following formula:

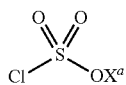

wherein $X^a$ is defined as described above,
to provide a compound (42a) represented by the following formula:

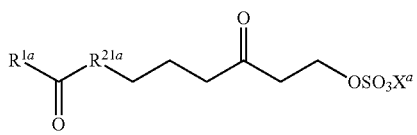

wherein $R^{1a}$, $R^{21a}$, and $X^a$ are defined as described above.

The steps (41a) are the same as those in the production method of the above-mentioned surfactant (a).

Regarding the reaction ratio between the compound (41a) and the chlorosulfonic acid in the step (42a), the chlorosulfonic acid may be used in an amount of 1 to 2 mol with respect to 1 mol of the compound (41a), so as to improve the yield and to reduce the waste.

The reaction in the step (42a) may be performed in the presence of a base. Examples of the base include alkali metal hydroxides, alkaline earth metal hydroxides, and amines.

The amines in the step (42a) are the same as those in the step (14a).

Regarding the amount of the base used in the step (42a), the base may be used in an amount of 1 to 2 mol with respect to 1 mol of the compound (41a), so as to improve the yield and to reduce the waste.

The reaction in the step (42a) may be performed in a polar solvent. The solvent to be used may be an organic solvent, including aprotic polar solvents, and specific examples thereof include ethers.

Performing the reaction in the step (42a) in a solvent provides a solution containing the compound (42a) after completion of the reaction. Optionally, the compound (42a) at high purity may be collected therefrom by adding water to the solution, leaving the mixture to stand and thereby separating the mixture into two phases, collecting the aqueous phase, and evaporating the solvent. When the compound (42a) contains a group represented by —OSO$_3$H (i.e., when X is H), an alkaline aqueous solution such as a sodium hydrogen carbonate aqueous solution or ammonia water may be used instead of water to convert the —OSO$_3$H into a sulfuric acid salt group.

The resulting compounds may be subjected to any of evaporation of a solvent or operations such as distillation and purification after the respective steps, whereby the purity of each compound may be increased.

The surfactant (b1) is a novel compound and may be produced, for example, by the following production method.

The surfactant (b1) may be produced by a production method including:

a step (11b) of hydroxylating a compound (10b) represented by the following formula:

$$R^{11b}—CH{=}CH—(CR^{2b}_2)_n—(OR^{3b})_p—(CR^{4b}_2)_q—L^b—OH$$

wherein $R^{2b}$ to $R^{4b}$, n, p, and q are defined as described above; $R^{11b}$ is H, a linear or branched alkyl group having 1 or more carbon atoms and optionally having a substituent or a cyclic alkyl group having 3 or more carbon atoms and optionally having a substituent, and optionally contains a monovalent or divalent heterocyclic ring or optionally forms a ring when containing 3 or more carbon atoms; $L^b$ is a single bond, —CO$_2$—B—*, —OCO—B—*, —CONR$^{6b}$—B—*, —NR$^{6b}$CO—B—*, or —CO— other than the carbonyl groups in -CO$_2$—B—, —OCO—B—, —CONR$^{6b}$—B—, —NR$^{6b}$CO—B—, where B is a single bond or an alkylene group having 1 to 10 carbon atoms and optionally having a substituent, $R^{6b}$ is H or an alkyl group having 1 to 4 carbon atoms and optionally having a substituent; and * indicates the bond to —OH in the formula, to provide a compound (11b) represented by the following formula:

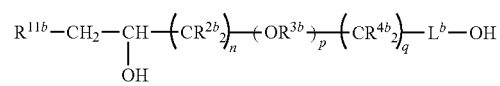

wherein $L^b$, $R^{2b}$ to $R^{4b}$, $R^{11b}$, n, p, and q are defined as described above;

a step (12b) of oxidizing the compound (11b) to provide a compound (12b) represented by the following formula:

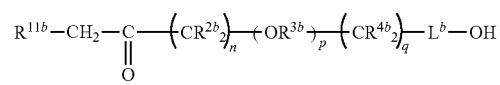

wherein $L^b$, $R^{2b}$ to $R^{4b}$, $R^{11b}$, n, p, and q are defined as described above; and a step (13b) of sulfuric-esterifying the compound (12b) to provide a compound (13b) represented by the following formula:

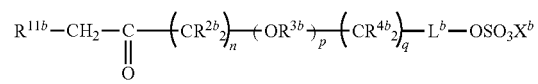

wherein $L^b$, $R^{2b}$ to $R^{4b}$, $R^{11b}$, n, p, q, and $X^b$ are defined as described above.

Preferably, ones for $R^{11b}$ may be the same as those for $R^{11b}$ in the above-mentioned surfactant (b). The hydroxylation in the step (11b) may be performed by the same method as in the hydroxylation in the step (100b) described above.

The step (12b) may be performed in the same manner as in the step (102b) for surfactant (b) described above.

The sulfuric-esterification in the step (13b) may be performed by reacting the compound (12b) and the sulfating reagent. Examples of the sulfating reagent include sulfur trioxide amine complexes such as a sulfur trioxide pyridine complex, a sulfur trioxide trimethylamine complex, and a sulfur trioxide triethylamine complex, sulfur trioxide amide complexes such as a sulfur trioxide dimethylformamide complex, sulfuric acid-dicyclohexylcarbodiimide, chlorosulfuric acid, concentrated sulfuric acid, and sulfamic acid. Regarding the amount of the sulfating reagent used, the sulfating reagent may be used in an amount of 0.5 to 10 mol with respect to 1 mol of the compound (12b).

The sulfuric-esterification in the step (13b) may be performed in a solvent. The solvent to be used may be an organic solvent, including ethers, halogenated hydrocarbons, aromatic hydrocarbons, pyridine, dimethyl sulfoxide, sulfolane, and nitriles.

The surfactant (b1) may also be produced by a production method including:

a step (21b) of ozonolyzing a compound (20b) represented by the following formula:

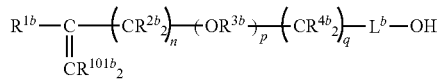

wherein $L^b$, $R^{1b}$ to $R^{4b}$, n, p, and q are defined as described above; and $R^{101b}$ b is an organic group, to provide a compound (21b) represented by the following formula:

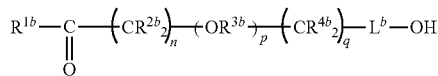

wherein $L^b$, $R^{1b}$ to $R^{4b}$, n, p, and q are defined as described above; and a step (22b) of sulfuric-esterifying the compound (21b) to provide a compound (22b) represented by the following formula:

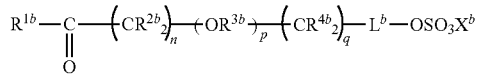

wherein $L^b$, $R^{1b}$ to $R^{4b}$, n, p, q, and $X^b$ are defined as described above.

$R^{101b}$s are each preferably an alkyl group having 1 to 20 carbon atoms. The two $R^{101b}$s may be the same as or different from each other.

The ozonolysis in the step (21b) may be performed by the same method as in the step (201b).

The sulfuric-esterification in the step (22b) may be performed by reacting the compound (21b) and a sulfating reagent under the same conditions as in the sulfuric-esterification in the step (13b).

The surfactant (b1) may also be produced by a production method including:

a step (31b) of epoxidizing a compound (30b) represented by the following formula:

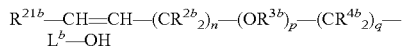

wherein $L^b$, $R^{2b}$ to $R^{4b}$, n, p, and q are defined as described above; $R^{21b}$ is H, a linear or branched alkyl group having 1 or more carbon atoms and optionally having a substituent or a cyclic alkyl group having 3 or more carbon atoms and optionally having a substituent, and optionally contains a monovalent or divalent heterocyclic ring or optionally fauns a ring when containing 3 or more carbon atoms, to provide a compound (31b) represented by the following formula:

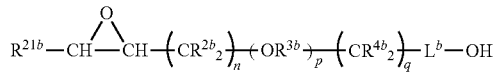

wherein $L^b$, $R^{2b}$ to $R^{4b}$, $R^{21b}$, n, p, and q are defined as described above; and a step (32b) of reacting the compound (31b) with a dialkylcopper lithium represented by $R^{22b}{}_2CuLi$ wherein $R^{22b}$ is a linear or branched alkyl group having 1 or more carbon atoms and optionally having a substituent or a cyclic alkyl group having 3 or more carbon atoms and optionally having a substituent, and optionally contains a monovalent or divalent heterocyclic ring or optionally fauns a ring when containing 3 or more carbon atoms, to provide a compound (32b) represented by the following formula:

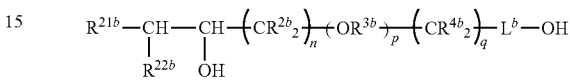

wherein $L^b$, $R^{2b}$ to $R^{4b}$, $R^{21b}$, $R^{22b}$, n, p and q are defined as described above;

a step (33b) of oxidizing the compound (32b) to provide a compound (33b) represented by the following formula:

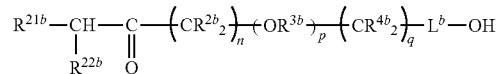

wherein $L^b$, $R^{2b}$ to $R^{4b}$, $R^{21b}$, $R^{22b}$, n, p and q are defined as described above; and a step (34b) of sulfuric-esterifying the compound (33b) to provide a compound (34b) represented by the following formula:

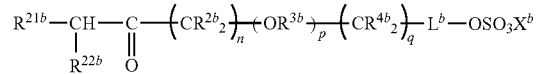

wherein $L^b$, $R^{2b}$ to $R^{4b}$, $R^{21b}$, $R^{22b}$, n, p, q, and $X^b$ are defined as described above.

$R^{21b}$ and $R^{22b}$ are the same as $R^{21b}$ b and $R^{22b}$ in the surfactant (b) described above.

The step (31b), the step (32b), and the step (33b) may be performed in the same manner as the step (301b), the step (302b), and the step (303b) described above.

The sulfuric-esterification in the step (34b) may be performed by reacting the compound (33b) and a sulfating reagent under the same conditions as in the sulfuric-esterification in the step (13b).

The surfactant (b1) may also be produced by a production method including:

a step (41b) of oxidizing a compound (10b) represented by the following formula:

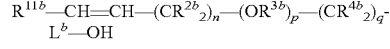

wherein $L^b$, $R^{2b}$ to $R^{4b}$, $R^{11b}$, n, p, and q are defined as described above, to provide a compound (41b) represented by the following formula:

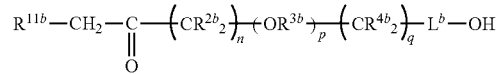

wherein $L^b$, $R^{2b}$ to $R^{4b}$, $R^{11b}$, n, p, and q are defined as described above; and a step (42b) of sulfuric-esterifying the compound (41b) to provide a compound (42b) represented by the following formula:

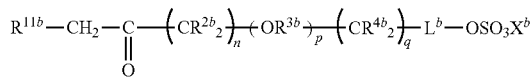

wherein $L^b$, $R^{2b}$ to $R^{4b}$, $R^{11b}$, n, p, q, and $X^b$ are defined as described above.

The oxidation in the step (41b) may be performed in the same manner as in the step (401b) described above.

The sulfuric-esterification in the step (42b) may be performed by reacting the compound (41b) and a sulfating reagent under the same conditions as in the sulfuric-esterification in the step (13b).

The surfactant (o1) may also be produced by a production method including:

a step (51) of reacting a compound (50) represented by the following formula:

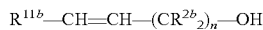

wherein $R^{2b}$, $R^{11b}$, and n are defined as described above, and a halogenating agent to provide a compound (51) represented by the following formula:

wherein $R^{2b}$, $R^{11b}$, and n are defined as described above; and $Z^{51b}$ is a halogen atom;

a step (52) of reacting the compound (51) with an alkylene glycol represented by HO—$R^{3b}$—$L^b$—OH where $L^b$ and $R^{3b}$ are defined as described above, to provide a compound (52) represented by the following formula:

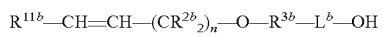

wherein $L^b$, $R^{2b}$, $R^{3b}$, $R^{11b}$, and n are defined as described above;

a step (53) of oxidizing the compound (52) to provide a compound (53) represented by the following formula:

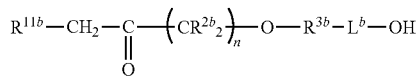

wherein $L^b$, $R^{2b}$, $R^{3b}$, $R^{11b}$, and n are defined as described above; and a step (54) of sulfuric-esterifying the compound (53) to provide a compound (54) represented by the following formula:

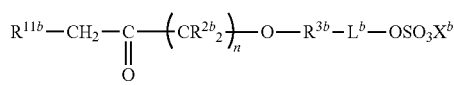

wherein $L^b$, $R^{2b}$, $R^{3b}$, $R^{11b}$, n, and $X^b$ are defined as described above.

$Z^{51b}$ is preferably F, Cl, Br, or I, more preferably Br.

Examples of the halogenating agent used in the step (51) include N-bromosuccinimide and N-chlorosuccinimide.

The halogenating agent may be used in an amount of 0.5 to 10.0 mol with respect to 1 mol of the compound (50).

The reaction in the step (51) may be performed in the presence of a phosphine such as triphenyl phosphine.

The phosphine may be used in an amount of 0.5 to 10.0 mol with respect to 1 mol of the compound (50).

The reaction in the step (51) may be performed in a solvent. The solvent to be used may be an organic solvent, and specific examples thereof include ethers, halogenated hydrocarbons, and aromatic hydrocarbons.

In the step (52), the alkylene glycol may be used in an amount of 0.5 to 10.0 mol with respect to 1 mol of the compound (51).

The reaction of the step (52) may be performed in the presence of a base. Examples of the base include sodium hydride, sodium hydroxide, and potassium hydroxide.

The base may be used in an amount of 0.5 to 10.0 mol with respect to 1 mol of compound (51).

The reaction in the step (52) may be performed in a solvent. The solvent to be used may be an organic solvent, and examples thereof include nitrogen-containing polar organic compound, ethers, halogenated hydrocarbons, and aromatic hydrocarbons.

The oxidation in the step (53) may be performed by allowing an oxidizing agent to act on the compound (52) in the presence of water and a palladium compound under the same conditions as in the oxidation in the step (41).

The sulfuric-esterification in the step (54) may be performed by reacting the compound (53) and a sulfating reagent under the same conditions as in the sulfuric-esterification in the step (13).

In any of the production methods described above, the resulting compounds may be subjected to any of evaporation of a solvent or operations such as distillation and purification after the respective steps, whereby the purity of each compound may be increased. When the resulting compound contains a group represented by —$OSO_3H$ (i.e., when $X^b$ is H), the compound may be brought into contact with an alkali such as sodium carbonate or ammonia so that —$OSO_3H$ may be converted into a sulfuric acid salt group.

Examples of the hydrocarbon surfactant include a surfactant (c) represented by the following formula (c):

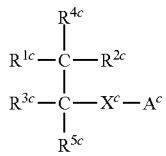

wherein $R^{1c}$ to $R^{5c}$ represent H or a monovalent substituent, provided that at least one of $R^{1c}$ and $R^{1c'}$ represents a group represented by the general formula: —$Y^c$—$R^{6c}$, at least one of $R^{2c}$ and $R^{5c}$ represents a group represented by the general formula: —$X^c$-$A^c$ or a group represented by the general formula: —$Y^c$—$R^{6c}$; $X^c$ is the same or different at each occurrence, and is a divalent linking group or a bond; $A^c$ is the same or different at each occurrence, and is —COOM, —$SO_3M$, or —$OSO_3M$, where M is H, a metal atom, $NR^{7c}_4$, imidazolium optionally having a substituent, pyridinium optionally having a substituent, or phosphonium optionally having a substituent, where $R^7$s are each H or an organic group; $Y^c$ is the same or different at each occurrence, and is a divalent linking group selected from the group consisting of —S($=$O)$_2$—, —O—, —COO—, —OCO—, —$CONR^{8c}$—, and —$NR^{8c}CO$—, or a bond, where $R^{8c}$ is H or an organic group; and $R^{6c}$ is the same or different at each occurrence, and represents an alkyl group having 2 or more carbon atoms which optionally contains at least one selected from the group consisting of a carbonyl group, an ester group, an amide group, and a sulfonyl group between carbon and carbon atoms; and any two of $R^{1c}$ to $R^{5c}$ are optionally bonded to each other to form a ring.

Next, the surfactant (c) will be described.

In the formula, $R^{1c}$ to $R^{5c}$ represents H or a monovalent substituent, provided that at least one of $R^{1c}$ and $R^{3c}$ represents a group represented by the general formula: —$Y^c$—$R^{6c}$, at least one of $R^{2c}$ and $R^{5c}$ represents a group represented by the general formula: —X-A or a group represented by the general formula: —$Y^c$—$R^{6c}$. Any two of $R^{1c}$ to $R^{5c}$ are optionally bonded to each other to form a ring.

The substituent which the alkyl group optionally has as $R^{1c}$ is preferably a halogen atom, a linear or branched alkyl group having 1 to 10 carbon atoms or a cyclic alkyl group having 3 to 10 carbon atoms, or a hydroxy group, and particularly preferably a methyl group or an ethyl group.

The alkylene group for $R^{1c}$ is preferably free of a carbonyl group.

In the alkyl group, 75% or less of the hydrogen atoms bonded to any of the carbon atoms may be replaced with halogen atoms, 50% or less thereof may be replaced with halogen atoms, or 25% or less thereof may be replaced with halogen atoms. The alkyl group is preferably a non-halogenated alkyl group containing no halogen atoms such as fluorine atoms and chlorine atoms.

The alkyl group preferably does not have any substituents.

$R^{1c}$ is preferably a linear or branched alkyl group having 1 to 10 carbon atoms and optionally having a substituent or a cyclic alkyl group having 3 to 10 carbon atoms and optionally having a substituent, more preferably a linear or branched alkyl group having 1 to 10 carbon atoms free of a carbonyl group or a cyclic alkyl group having 3 to 10 carbon atoms free of a carbonyl group, still more preferably a linear or branched alkyl group having 1 to 10 carbon atoms having no substituent, and still further preferably a linear or branched alkyl group having 1 to 3 carbon atoms having no substituent, particularly preferably a methyl group (—$CH_3$) or an ethyl group (—$C_2H_5$), and most preferably a methyl group (—$CH_3$).

The monovalent substituent is preferably a group represented by the general formula: —$Y^c$—$R^{6c}$, a group represented by the general formula: —$X^c$-$A^c$, —H, a C1-20 alkyl group optionally having a substituent, —$NH_2$, —$NHR^{9c}$, where $R^{9c}$ is an organic group, —OH, —$COOR^{9c}$, where $R^{9c}$ is an organic group, or —$OR^{9c}$, where $R^{9c}$ is an organic group. The alkyl group preferably has 1 to 10 carbon atoms.

$R^{9c}$ is preferably a C1-10 alkyl group or a C1-10 alkylcarbonyl group, and more preferably a C1-4 alkyl group or a C1-4 alkylcarbonyl group.

In the formula, $X^c$ is the same or different at each occurrence, and represents a divalent linking group or a bond.

When $R^{6c}$ is free of any of a carbonyl group, an ester group, an amide group, and a sulfonyl group, X is preferably a divalent linking group containing at least one selected from the group consisting of a carbonyl group, an ester group, an amide group and a sulfonyl group.

$X^c$ is preferably a divalent linking group containing at least one selected from the group consisting of —CO—, —S(=O)$_2$—, —O—, —COO—, —OCO—, —S(=O)$_2$—O—, —O—S(=O)$_2$—, —$CONR^{8c}$—, and —$NR^{8c}CO$—, a C1-10 alkylene group, or a bond. $R^{8c}$ represents H or an organic group.

$R^{8c}$ is preferably H or a C1-10 organic group, more preferably H or a C1-4 organic group, and still more preferably H.

In the formula, $A^c$ is the same or different at each occurrence, and represents —COOM, —$SO_3M$, or —$OSO_3M$, where M is H, a metal atom, $NR^{7c}_4$, imidazolium optionally having a substituent, pyridinium optionally having a substituent, or phosphonium optionally having a substituent, where $R^{7c}$s are each H or an organic group; and the four $R^{7c}$s are the same as or different from each other.

$R^{7c}$ is preferably H or a C1-10 organic group, and more preferably H or a C1-4 organic group.

Examples of the metal atom include alkali metals (Group 1) and alkaline earth metals (Group 2), and preferred is Na, K, or Li.

M is preferably H, a metal atom, or $NR^{7c}_4$, more preferably H, an alkali metal (Group 1), an alkaline earth metal (Group 2), or $NR^{7c}_4$, still more preferably H, Na, K, Li, or $NH_4$, still further preferably Na, K, or $NH_4$, particularly preferably Na or $NH_4$, and most preferably $NH_4$.

In the formula, $Y^c$ is the same or different at each occurrence and is a divalent linking group selected from the group consisting of —S(=O)$_2$—, —O—, —COO—, —OCO—, —$CONR^{8c}$—, and —$NR^{8c}CO$—, or a bond, where $R^{8c}$ represents H or an organic group.

$Y^c$ is preferably a divalent linking group selected from the group consisting of a bond, —O—, —COO—, —OCO—, —$CONR^{8c}$—, and —$NR^{8c}CO$—, and more preferably a divalent linking group selected from the group consisting of a bond, —COO—, and —OCO—.

$R^{8c}$ is preferably H or a C1-10 organic group, more preferably H or a C1-4 organic group, and still more preferably H.

In the formula, $R^{6c}$ is the same or different at each occurrence, and represents an alkyl group having 2 or more carbon atoms which optionally contains at least one selected from the group consisting of a carbonyl group, an ester group, an amide group, and a sulfonyl group between carbon and carbon atoms. The number of carbon atoms of the organic group for $R^{6c}$ is preferably 2 to 20, and more preferably 2 to 10.

The alkyl group for $R^{6c}$ may optionally contain one or more of at least one selected from the group consisting of a carbonyl group, an ester group, an amide group, and a sulfonyl group between carbon-carbon atoms, but these groups are not located at an end of the alkyl group. In the alkyl group for $R^{6c}$, 75% or less of the hydrogen atoms bonded to any of the carbon atoms may be replaced with halogen atoms, 50% or less thereof may be replaced with halogen atoms, or 25% or less thereof may be replaced with halogen atoms. The alkyl group is preferably a non-halogenated alkyl group containing no halogen atoms such as fluorine atoms and chlorine atoms.

$R^{6c}$ is preferably:

a group represented by the general formula: —$R^{10c}$—CO—$R^{11c}$, a group represented by the general formula: —$R^{10c}$—COO—$R^{11c}$, a group represented by the general formula: —$R^{11c}$, a group represented by the general formula: —$R^{10c}$—$NR^{8c}CO$—$R^{11c}$, or a group represented by the general formula: —$R^{10c}$—$CONR^{8c}$—$R^{11c}$, wherein $R^{8c}$ represents H or an organic group, $R^{10c}$ is an alkylene group, and $R^{11c}$ is an alkyl group optionally having a substituent.

$R^{6c}$ is more preferably a group represented by the general formula: —$R^{10c}$—CO—$R^{11c}$.

$R^{8c}$ is preferably H or a C1-10 organic group, more preferably H or a C1-4 organic group, and still more preferably H.

The number of carbon atoms of the alkylene group for $R^{10c}$ is preferably 1 or more, and more preferably 3 or more, and preferably 20 or less, more preferably 12 or less, still more preferably 10 or less, and particularly preferably 8 or less. The number of carbon atoms of the alkylene group for $R^{10c}$ is preferably 1 to 20, more preferably 1 to 10, and still more preferably 3 to 10.

The number of carbon atoms of the alkyl group for $R^{11c}$ may be, for example, 1 to 20, preferably 1 to 15, more preferably 1 to 12, still more preferably 1 to 10, still further preferably 1 to 8, even more preferably 1 to 6, even further preferably 1 to 3, particularly preferably 1 or 2, and most preferably 1. Further, the alkyl group for $R^{11c}$ is preferably constituted of only primary carbon, secondary carbon, and tertiary carbon, and particularly preferably constituted of only primary carbon and secondary carbon. That is, $R^{11c}$ is preferably a methyl group, an ethyl group, an n-propyl group, or an isopropyl group, and most preferably a methyl group in particular.

EXAMPLES

Next, the present invention will be described with reference to Examples, but the present invention is not limited to only these Examples.

The parameters in the Examples were determined by the following methods.

PTFE solids content in PTFE aqueous dispersion

One gram of the PTFE aqueous dispersion was dried at 150° C. for 60 minutes in an air dryer. The percentage of the mass of the non-volatile matter to the mass (1 g) of the aqueous dispersion was expressed by percentage, and this percentage value was used as the solid content.

Average Primary Particle Size

A PTFE aqueous dispersion was diluted with water to have a solid content concentration of 0.15 mass %. Then, the transmittance of incident light at 550 nm relative to the unit length of the resulting diluted latex was determined and the number-based length average particle size was determined by measuring the Feret diameter in a transmission electron microscopic image. Based on these values, a calibration curve was drawn. Using this calibration curve, the average primary particle size of the PTFE particles in the PTFE aqueous dispersion was determined from the measured transmittance of incident light at 550 nm of each sample.

Standard Specific Gravity (SSG)

Using a PTFE sample molded in conformity with ASTM D4895-89, the standard specific gravity (SSG) of PTFE was determined by the water displacement method described in ASTM D-792.

Apparent Density

The apparent density of the resulting PTFE powder was determined in conformity with JIS K6892.

Average Particle Size of PTFE Powder

The average particle size of the resulting PTFE powder was determined in conformity with JIS K6891.

Color Tone of PTFE Powder

The color tone (L*, Z) of the PTFE powder was determined using a colorimetric colorimeter ZE-6000 (manufactured by Nippon Denshoku Industries Co., Ltd.) (CIELAB color scale) in conformity with JIS Z8781-4.

The method for preparing a PTFE sample for measurement of the color tone (L*, Z) is as follows.

4.0 g of PTFE powder was weighed, charged in a cylindrical mold having an inner diameter of 28.6 mm, and kept at a pressure of 8.27 MPa for 1 minute to produce a disk-shaped PTFE molded body (non-sintered) having a thickness of about 4 mu. After taking out the disk-shaped PTFE molded body (non-sintered) from the mold, the molded body was left at 25° C. for 24 hours.

Using the above device, the color tone (L*, Z) (non-sintered) of the disk-shaped PTFE molded body (non-sintered) was determined.

Next, the disk-shaped PTFE molded body (non-sintered) was heat-treated in an electric furnace heated to 385° C. for 10 minutes, and then taken out of the electric furnace to obtain a disk-shaped PTFE molded body (after sintered). Using the above device, the color tone (L*, Z) (after sintered) of the resulting disk-shaped PTFE molded body (after sintered) was determined.

Synthesis Example 1

A mixture of 10-undecen-1-ol (16 g), 1,4-benzoquinone (10.2 g), DMF (160 mL), water (16 mL) and $PdCl_2$ (0.34 g) was heated with stirring at 90° C. for 12 hours.

The solvent was then evaporated under reduced pressure. The resulting residue was subjected to liquid separation and purified by column chromatography, whereby 11-hydroxyundecan-2-one (15.4 g) was obtained.

The spectrum data of the resulting 11-hydroxyundecan-2-one are the following.

1H-NMR (CDCl3) δ ppm: 1.29-1.49 (m, 14H), 2.08 (s, 3H), 2.45 (J=7.6, t, 2H), 3.51 (J=6.5, t, 2H)

A mixture of 11-hydroxyundecan-2-one (13 g), sulfur trioxide triethylamine complex (13.9 g), and tetrahydrofuran (140 mL) was stirred at 50° C. for 12 hours. A solution of sodium methoxide (3.8 g) in methanol (12 mL) was dropwise added to the reaction solution.

The solid precipitate was filtered under reduced pressure and the residue was washed with ethyl acetate, whereby sodium 10-oxounedecyl sulfate (15.5 g) (hereinafter, referred to as a surfactant A) was obtained. The spectrum data of the resulting sodium 10-oxounedecyl sulfate are the following.

1H-NMR (CDCl3) δ ppm: 1.08 (J=6.8, m, 10H), 1.32 (m, 2H), 1.45 (m, 2H), 1.98 (s, 3H), 2.33 (J=7.6, t, 2H), 3.83 (J=6.5, t, 2H)

Synthesis Example 2

A stainless steel autoclave having an inner volume of 6 L was charged with 3500 g of deionized degassed water, 100 g of paraffin wax, and 0.122 g of the surfactant A. The reactor was sealed and the system was purged with nitrogen, so that oxygen was removed. The reactor was heated up to 70° C. and TFE was filled into the reactor such that the reactor was adjusted to 0.78 MPa. Then, 0.070 g of ammonium persulfate (APS) serving as a polymerization initiator was put thereinto. TFE was charged such that the reaction pressure was maintained at 0.78 MPa. The surfactant A was added 9 times, in a total amount of 1.10 g, during the reaction. When 425 g in total of TFE was charged, the stirring was stopped and the pressure was released until the reactor was adjusted to the atmospheric pressure. The aqueous dispersion was collected from the reactor and cooled so that the paraffin wax was separated, whereby a PTFE aqueous dispersion A was obtained.

The solid content concentration in the resulting PTFE aqueous dispersion B was 10.7 mass %.

The PTFE particles contained in the resulting PTFE aqueous dispersion B had an average primary particle size of 178 nm.

Comparative Example 1

The PTFE aqueous dispersion A obtained in Synthesis Example 2 was mixed with deionized water such that the specific gravity (25° C.) was adjusted to 1.030. A 1 L glass coagulation tank equipped with an anchor type stirring blade and a baffle plate was charged with 0.55 L of the PTFE aqueous dispersion with the adjusted specific gravity, and the temperature was controlled such that the internal temperature was 28° C. The control was immediately followed by addition of 1.3 g of nitric acid (10%), simultaneously with initiation of stirring at a stirring speed of 600 rpm. After the stirring was initiated, the aqueous dispersion was confirmed to turn into the slurry form and formation of wet PTFE powder therein was confirmed. Then, stirring was continued for another minute.

Subsequently, the operations of separating the wet PTFE powder by filtration, charging the wet PTFE powder and 0.55 L of deionized water into the coagulation tank, adjusting the temperature to 25° C., and washing the polymer powder at a stirring speed of 600 rpm was repeated twice.

After the washing, the wet PTFE powder was separated by filtration, and dried at 150° C. for 18 hours using a hot air circulating drier, whereby a PTFE powder was obtained.

The standard specific gravity of the resulting PTFE powder was determined to be 2.175.

The apparent density, average particle size, and color tone (L*, Z) of the PTFE powder were determined. The results are shown in Table 1.

Example 1

The PTFE aqueous dispersion A obtained in Synthesis Example 2 was mixed with deionized water such that the specific gravity (25° C.) was adjusted to 1.030. 0.55 L of the diluted PTFE aqueous dispersion was adjusted to 25° C. in advance, and then charged into a glass beaker having a depth of 18.5 cm and an inner diameter of 8.5 cm.

The nozzle portion of the Ultrasonic homogenizer UH-8-3C (manufactured by Ultrasonic Engineering Co., Ltd.) was immersed in the diluted PTFE aqueous dispersion and subjected to ultrasonic treatment (300W, 19 kHz) for 12 minutes, whereby confirmation was made that a wet PTFE powder was famed.

After the wet PTFE powder was separated by filtration from the coagulated discharge water, the wet PTFE powder was washed with 0.55 L of deionized water (stirring speed 600 rpm) using a 1 L glass vessel equipped with an anchor type stirring blade and a baffle plate. The deionized water was replaced and the washing operation was repeated twice more.

After the washing, the wet PTFE powder was separated by filtration, and dried at 150° C. for 18 hours using a hot air circulating drier, whereby a PTFE powder was obtained.

In the same manner as in Comparative Example 1, the apparent density, average particle size, and color tone (L*, Z) of the PTFE powder were determined. The results are shown in Table 1.

TABLE 1

|  | Comparative Example 1 | Example 1 |
| --- | --- | --- |
| Apparent density g/ml | 0.55 | 0.48 |
| Average particle size μm | 473 | 724 |
| Color tone L* non-sintered | 85.2 | 92.0 |
| Color tone Z non-sintered | 78.9 | 94.0 |
| Color tone L* after sintered | 24.0 | 47.5 |
| Color tone Z after sintered | 4.4 | 18.5 |

The invention claimed is:

1. A method for producing a polytetrafluoroethylene powder, comprising:
applying an ultrasonic wave to a polytetrafluoroethylene aqueous dispersion containing a polytetrafluoroethylene particle and an anionic hydrocarbon surfactant to coagulate the polytetrafluoroethylene particle,
wherein the application of the ultrasonic wave is performed with an output of 100 W or more and at a frequency of 15 kHz or more.

2. The production method according to claim 1, wherein the polytetrafluoroethylene aqueous dispersion is obtained by polymerizing tetrafluoroethylene in an aqueous medium in the presence of the anionic hydrocarbon surfactant.

* * * * *